US007023356B2

(12) United States Patent
Burkhardt et al.

(10) Patent No.: US 7,023,356 B2
(45) Date of Patent: Apr. 4, 2006

(54) SYSTEM AND METHOD FOR MONITORING INDIVIDUALS AND OBJECTS ASSOCIATED WITH WIRELESS IDENTIFICATION TAGS

(75) Inventors: Donald P. Burkhardt, Dix Hills, NY (US); Frederick M. Ganz, Nesconset, NY (US); Philip E. Burkhardt, Melville, NY (US)

(73) Assignee: Aero-Vision Technologies, Inc., Hauppauge, NY (US)

( * ) Notice: Subject to any disclaimer, the term of this patent is extended or adjusted under 35 U.S.C. 154(b) by 274 days.

(21) Appl. No.: 10/303,668

(22) Filed: Nov. 25, 2002

(65) Prior Publication Data

US 2003/0128100 A1 Jul. 10, 2003

Related U.S. Application Data

(60) Provisional application No. 60/333,353, filed on Nov. 26, 2001.

(51) Int. Cl.
G08B 5/22 (2006.01)
G01S 13/08 (2006.01)

(52) U.S. Cl. ............... 340/825.49; 342/118; 342/126; 342/127; 342/128

(58) Field of Classification Search ........... 340/825.49, 340/572.1, 573.1, 10.1, 10.31; 342/118, 342/126, 127, 128
See application file for complete search history.

(56) References Cited

U.S. PATENT DOCUMENTS

| 3,823,401 | A | | 7/1974 | Berg et al. |
|---|---|---|---|---|
| 5,003,534 | A | | 3/1991 | Gerhardt et al. |
| 5,051,565 | A | | 9/1991 | Wolfram |
| 5,051,741 | A | | 9/1991 | Wesby |
| 5,121,387 | A | | 6/1992 | Gerhardt et al. |
| 5,175,882 | A | | 12/1992 | Higashijima |
| 5,197,125 | A | | 3/1993 | Engel et al. |
| 5,218,344 | A | * | 6/1993 | Ricketts ................... 340/573.4 |
| 5,307,349 | A | * | 4/1994 | Shloss et al. .............. 340/10.2 |
| 5,313,052 | A | | 5/1994 | Watanabe et al. |
| 5,434,850 | A | | 7/1995 | Fielding et al. |
| 5,478,991 | A | | 12/1995 | Watanabe et al. |
| 5,479,400 | A | | 12/1995 | Dilworth et al. |
| 5,629,981 | A | | 5/1997 | Nerlikar |

(Continued)

OTHER PUBLICATIONS

U.S. Appl. No. 09/231,458, filed Jan. 14, 1999, Ganz et al.

(Continued)

Primary Examiner—Brian Zimmerman
Assistant Examiner—Clara Yang
(74) Attorney, Agent, or Firm—Hoffmann & Baron, LLP

(57) ABSTRACT

A monitoring system includes a wireless identification tag and interrogator. The tag includes memory that stores information associated with a person or object associated with the wireless identification tag. The interrogator wirelessly transmits an interrogation signal, which includes a sequence of interrogation codes, to the wireless identification tag. If one of the interrogation codes is associated with the wireless identification tag, the tag wirelessly transmits an acknowledgment signal associated with the tag. The interrogator receives the acknowledgment signal, which indicates that the wireless identification tag has been monitored within an area. A method of monitoring a person or object within a defined area includes the steps of storing information in a wireless identification tag; transmitting an interrogation signal; receiving the interrogation signal by the tag; determining whether an interrogation code in the received interrogation signal is associated with the tag and, if so, transmitting an acknowledgment signal.

44 Claims, 15 Drawing Sheets

U.S. PATENT DOCUMENTS

| | | |
|---|---|---|
| 5,634,196 A | 5/1997 | Alford |
| 5,640,151 A | 6/1997 | Reis et al. |
| 5,686,902 A * | 11/1997 | Reis et al. ............. 340/825.49 |
| 5,745,037 A | 4/1998 | Guthrie et al. |
| 5,793,639 A | 8/1998 | Yamazaki |
| 5,796,351 A | 8/1998 | Yabuki |
| 5,831,531 A | 11/1998 | Tuttle |
| 5,856,788 A * | 1/1999 | Walter et al. .......... 340/825.49 |
| 5,877,675 A * | 3/1999 | Rebstock et al. ...... 340/825.49 |
| 5,914,671 A | 6/1999 | Tuttle |
| 5,920,053 A | 7/1999 | DeBrouse |
| 5,920,287 A * | 7/1999 | Belcher et al. ............. 342/450 |
| 5,929,779 A | 7/1999 | MacLellan et al. |
| 5,942,987 A | 8/1999 | Heinrich et al. |
| 5,952,922 A | 9/1999 | Shober |
| 5,977,913 A | 11/1999 | Christ |
| 6,027,027 A | 2/2000 | Smithgall |
| 6,130,623 A * | 10/2000 | MacLellan et al. ......... 340/10.1 |
| 6,177,861 B1 * | 1/2001 | MacLellan et al. ......... 340/10.1 |
| 6,268,797 B1 * | 7/2001 | Berube et al. ............ 340/573.1 |
| 6,720,888 B1 * | 4/2004 | Eagleson et al. ...... 340/825.49 |
| 2002/0008615 A1 * | 1/2002 | Heide et al. ................. 340/426 |

OTHER PUBLICATIONS

S.A. Fulling, "Large Numbers, the Chinese Remainder Theorem, and the Circle of Fifths", Texas A&M University, College Station, TX (2001).

* cited by examiner

SYSTEM AND METHOD FOR MONITORING INDIVIDUALS AND OBJECTS ASSOCIATED WITH WIRELESS IDENTIFICATION TAGS

CROSS-REFERENCE TO RELATED APPLICATION

This application claims the benefit of U.S. Provisional Application Ser. No. 60/333,353, filed Nov. 26, 2001, which is incorporated herein by reference.

BACKGROUND OF THE INVENTION

1. Field of the Invention

The present invention relates generally to monitoring systems and, more particularly, to tracking systems using advanced signal processing techniques to monitor wireless identification tags.

2. Description of the Related Art

Conventional monitoring systems are limited by the number of identification tags that may be securely identified, dynamically added or subtracted from a track list, and continually monitored. However, updates of all tags are necessary every few seconds in a busy open space or lobby to assure secure identification and tracking of each tag at all times.

At large open facilities, hundreds or even thousands of tags must be monitored while dozens of additions and deletions are generated irregularly. The location and tracking of tags must be verified continually (without gaps) at all times from arrival to departure, individuals must be processed efficiently at each station, and each individual and his tags must be positively identified upon entry and departure. These capabilities are not found in conventional monitoring systems.

OBJECTS AND SUMMARY OF THE INVENTION

It is an object of the present invention to provide a system and method for monitoring and tracking individuals and objects within an area.

It is another object of the present invention to provide a system and method for wirelessly interrogating large quantities of wireless identification tags associated with persons or objects using a pseudo random sequence of interrogation codes and/or pseudo randomly varying interrogation codes to determine the existence of the tags and their position within an area, such as a hotel, airport, park, facility, office, home, business, building, school, day care center, or apartment.

It is yet another object of the present invention to provide a system and method for monitoring individuals and objects that may be selectively programmed according to range and direction of the individual or object in relation to an interrogating source.

It is still another object of the present invention to provide a system and method for monitoring individuals and objects within an area using information associated with the individual or object, such as visual images, physical characteristics, and flight, reservation, and/or accommodation data.

It is a further object of the present invention to provide a system and method for monitoring individuals and objects within an area that incorporates security features, such as encryption and pseudo random modification of interrogation codes.

It is still a further object of the present invention to provide a system and method for monitoring individuals and objects that is capable of conserving power during periods of inactivity.

The monitoring system formed in accordance with the present invention provides efficient and secure identification, and continuous monitoring of the location of large numbers of individuals and objects associated with wireless identification tags within an area. The system is also able to add or delete tags from an active list and modify information within the tags using unique equipment and signal processing techniques. The system is applicable to: (1) hotels, including guest check-in, tracking, luggage delivery to rooms, keyless room entry, automated billing of guest services using a wireless identification key, and the hotel security of guests and their baggage; (2) airlines including check-in, passenger and baggage tracking and security; (3) maritime shipping and transportation industries, including cruise ships for guest location, tracking, and luggage control; (4) casinos and resorts, for client tracking and profiling; (5) schools, day care centers, homes; and (6) diverse applications, such as ski slopes and amusement parks for automated ticketing, personnel location, and safety.

The system has unique features that differentiate it from other systems, and specific functional/implementation applications associated with the wireless identification tag technology itself, which include the following:

pseudo random sequencing of interrogation codes and an ability of the wireless identification tag to detect its code and reply;

interrogation codes that are spatially dependent i.e., transmitted information and replies constrained to a user-defined range, or a min/max range and the use of directional antennas at the host to define an angular extent of requested replies (The system can thus be tailored to interrogate specific sectors or areas, without the interrogation of all tags all of the time. An example of this is interrogating only within 15 feet or a selected distance from a counter or sales desk);

provision of range or distance information of a tag from a host for location purposes, and where there are multiple hosts, viewing a common area and deriving the exact position of tags through triangulation techniques;

storage of video images and other pertinent information on the tag or pertinent data that enables the host to retrieve video images from a data bank;

data encryption for security;

periodically listening for wireless identification tags, where a receiver is activated for only a brief instant, and then goes into a sleep mode, which conserves battery power by a factor of 10:1 or more; and automatically changing (pseudo randomly or otherwise) identification codes periodically for one or more wireless identification tag, through the host or otherwise, to guard against unauthorized tracking and monitoring.

The system has significant design and functional advantages that differentiate it from other wireless identification tag technologies, which include the following:

long range coverage from each tag of, for instance, 3300 feet or more;

ability to accommodate interrogation of large numbers of tags simultaneously, which is an essential feature associated with long range coverage;

ability to provide ranging to each tag from an interrogator to provide critical distance information;

on-tag memory and two-way data transfer and modification to and from an interrogating source; and reprogrammable identification codes and other security features.

In one embodiment of the wireless identification tag, a clock is preferably included with the tag, which has a programmed wake-up time for the tag to go active. This feature enables, for example, the tag or key to be mailed to a hotel guest well in advance of an intended visit while the tag remains in a sleep mode preserving battery power until awakened by an on-tag clock shortly before the intended visit.

A monitoring system, having some of the features in accordance with the present invention, includes at least one wireless identification tag and an interrogator. The wireless identification tag includes memory that stores information associated with a person or object associated with the wireless identification tag. The interrogator wirelessly, such as by using radio frequency signals for interrogation and replies or acknowledgments, transmits an interrogation signal, which includes a sequence of interrogation codes, to the wireless identification tag. If one of the interrogation codes is associated with the wireless identification tag, the tag wirelessly transmits an acknowledgment signal including a portion of the information associated with the tag. The interrogator receives the acknowledgment signal, which indicates that the person or object has been monitored within an area.

A method of monitoring a person or object within an area, having some of the features in accordance with the present invention, includes the steps of storing information in a wireless identification tag; transmitting an interrogation signal wirelessly; receiving the interrogation signal by the wireless identification tag; determining whether an interrogation code in the received interrogation signal is associated with the wireless identification tag; transmitting an acknowledgment signal in response to determining that an interrogation code is associated with the wireless identification tag; and receiving the acknowledgment signal. The information is associated with the person or object, and the person or object is associated with the wireless identification tag. The interrogation signal includes a sequence of interrogation codes, at least one of which is associated with the wireless identification tag.

DETAILED DESCRIPTION OF THE PREFERRED EMBODIMENTS

Figure 1:
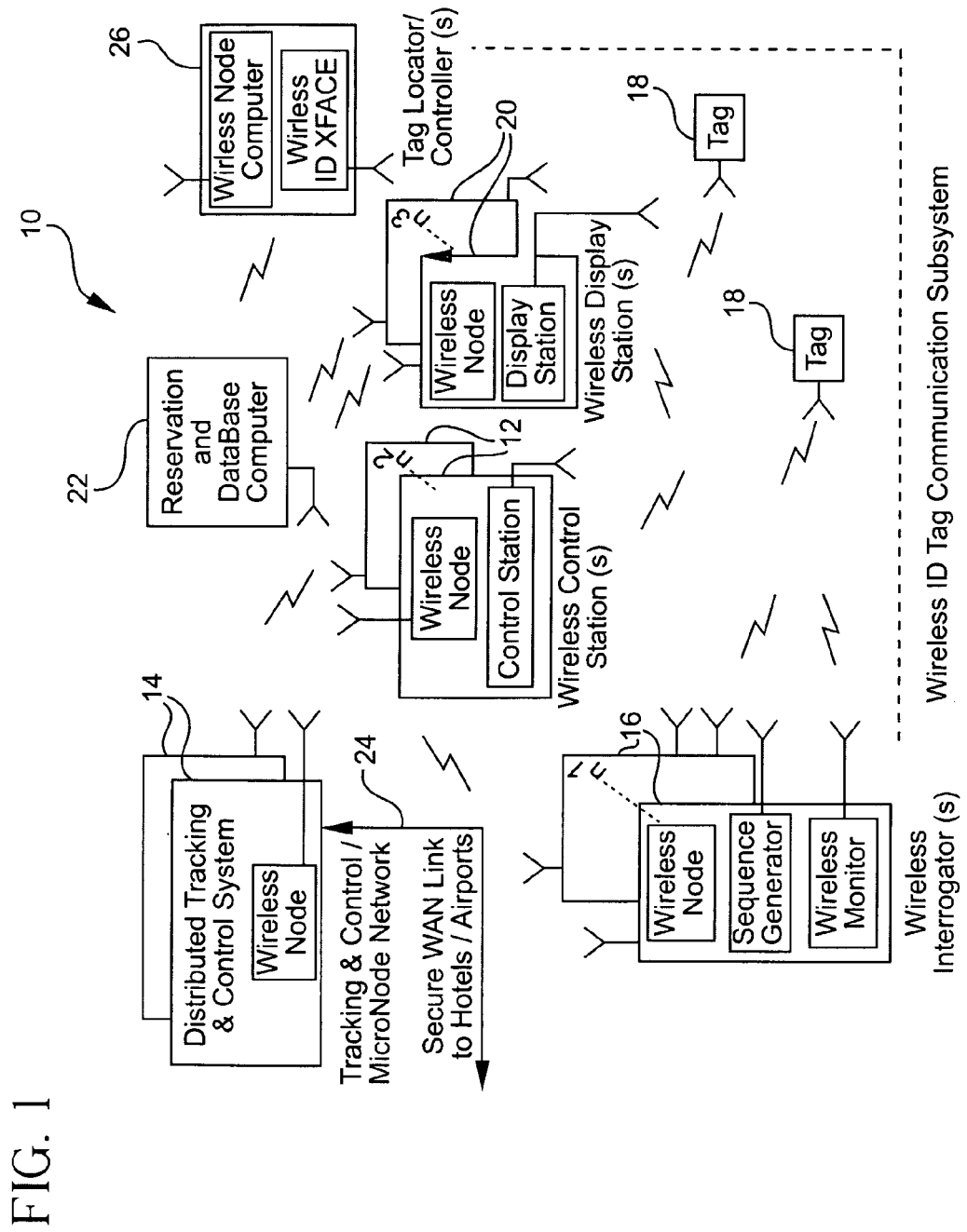
FIG. 1 is a block diagram of a wireless identification tag security system formed in accordance with the present invention.

The monitoring system formed in accordance with the present invention preferably includes the following:

one or more wireless node interrogators, which preferably transmit a pseudo random sequence of interrogation codes for tags currently active in a secure area or areas;

wireless identification tags, which preferably transmit a pseudo random acknowledgment code upon detecting an assigned interrogation code;

one or more wireless node display stations, which preferably detect the acknowledgment codes within the secure area;

a MicroNode™ or equivalent network of track and control computers that preferably synchronize interrogation tag responses or acknowledgment signal monitoring; receive data from monitors; maintain location updates, acknowledgment and status regarding tags; forward update information to the interrogation sequence generators; and provide monitoring and tracking status to control stations; and one or more control stations providing tag additions, deletions, identification, video images, destinations, codes, proximity information and other data to the MicroNode™ or equivalent network.

Tag proximity sensing is preferably performed at the control station so that when a tag enters the area surrounding the control station, a proximity mode is entered, which permits the control station operator to read stored information associated with the proximate tag, access a video verification image, modify or deactivate the tag, and forward tag changes to the track and control computers. The relay of tag reports and other information is preferably performed over the MicroNode™ or equivalent network upon request.

Interface to the Wireless Node System

High-speed wireless networks and technology marketed under the trade name MicroNode™ by Aero-Vision Technologies, Inc., 350 Motor Parkway, Hauppauge, N.Y. 11788 are disclosed in U.S. patent application Ser. No. 09/231,458, filed Jan. 14, 1999 that issued as U.S. Pat. No. 6,584,080 on Jun. 24, 2003, which is incorporated herein by reference. These networks and technology are applicable to so-called "last mile" and in-building/open space data communication systems, in which both traditional wired solutions and wireless technologies have been unable to provide effective service. In conjunction with wireless identification tags, MicroNode™ networks provide advantageous capabilities for security applications requiring the secure identification and tracking of very large numbers of tags.

The monitoring system formed in accordance with the present invention is preferably multifunctional and provides security at several locations and levels. For instance, the system positively identifies and tracks both guests and their baggage at all points throughout their travel in supported aircrafts and hotels worldwide.

The monitoring system provides a higher level of guest and baggage identification and control than is available in conventional systems. Digital signal processors are preferably used to improve guest check-in and servicing latency. At guest check-in, for instance, a digital image of the individual is taken and stored. Upon gaining proximity to a boarding or control station, the image and other information is preferably retrieved from a database and displayed on a monitor. The speed of the wireless node network makes this process nearly instantaneous.

Proprietary wireless identification tags with a unique set of capabilities, which preferably include sensing ranges from 1 to 3300 feet or more, work in conjunction with the wireless node network. This feature enables guests and their bags to be tracked and identified throughout the hotel or airline environment using flexible resolution and ranges.

Equipment at stations in the network preferably communicate over the MicroNode™ or an equivalent host network. MicroNodes™ are designed to operate in security sensitive and/or hostile environments. The nodes provide a communication network that includes multiple redundant paths, which substantially improve tolerance to damage and faults, as well as resistance to detection, jamming, and interception. If a station is compromised, additional data encryption preferably prevents the possibility of unauthorized intrusion into the communication links. Stations in the network preferably operate as smart nodes with low latency and full throughput to the system, which is preferably self-diagnostic and self-encoding.

Wireless identification tags are preferably small portable devices that may be carried by guests, personnel, and/or attached to baggage and other objects for tracking and identification. The wireless identification tag is preferably designed to be interrogated by external sensors linked to the system. The wireless identification tag, upon interrogation, preferably responds with an identification code, as well as other information electronically stored within the tag, to the interrogating source.

The interrogating source preferably transfers the identification code and additional information received from the tags to an external data management system. The initial wireless identification code and information is preferably programmed into the tag at a counter using a variety of wired and/or wireless means. Data communication between the wireless identification tag and the interrogating source is preferably implemented by wireless means using a portion of the electromagnetic spectrum, which may include the electro-optical/infra-red (EO/IR) spectrum. Wireless identification technology preferably includes (1) wireless identification tags, as described above, (2) specific interrogation software, which is preferably installed on an external interrogating sensor and system for communication with the wireless identification tags, and (3) specific tracking software installed in an external data management system to track wireless identification tag signals.

The wireless node system preferably provides a variety of interrogation sequences to the wireless identification tag. The wireless node system is a hybrid-networked system, preferably consisting of wireless and/or wired data transmission means, data protocol control, data traffic control, and network security functions. The system is preferably deployed in a hotel or airport and includes interrogation software for interrogating and tracking wireless identification tags. The wireless node system may include or interface to an external data management system, which preferably includes wireless identification tracking software.

The wireless node system may carry additional data communication traffic unrelated to the wireless identification tags or security functions. The communication protocols of the wireless identification tag are designed to be carried by the wireless node system using interrogation software.

Wireless Identification Technology

Wireless identification tag technology has been developed with associated interrogation software for the secure identification and tracking of large numbers of electronic tags, which are preferably used with wireless node high-speed data distribution networks having wireless links to the wireless identification tags. The system is multifunctional and preferably provides security at several locations and levels.

For instance, in the hospitality industry, the system is preferably able to positively identify and track both guests and their baggage at all points throughout supported airports and hotels. The wireless identification technology is equally useful in other applications that require secure identification, tracking, and location of objects and/or individuals.

In a preferred embodiment, a digital image of a guest is taken and stored during check-in. Upon gaining proximity to a wireless identification station, the image and other information is retrieved from the database and displayed on a monitor.

While digital imaging is one method of guest identification, other methods, such as fingerprint and retinal imaging may also be used with wireless identification tag technology. The speed of the wireless node network makes this process nearly instantaneous. Wireless identification tags, in conjunction with interrogation terminals and the wireless node network, provide for a unique set of capabilities including sensing ranges from one to 3300 feet or more, which may be selected under software control by the interrogating source. This feature enables guests and luggage to be tracked and identified throughout the facility using flexible resolutions and ranges.

The wireless identification tags and data management software system preferably enable a large number of identification tags to be securely identified, dynamically added or subtracted from a track list, and continually monitored. An update of all tags is preferably performed every few seconds in a busy open space to ensure the secure identification and tracking of each tag at all times.

At a hotel or other large public facility, hundreds or even thousands of tags may require continuous monitoring while dozens of additions and deletions are generated irregularly and the location and tracking of each tag is continuously verified from check-in to departure. Individuals are preferably processed efficiently at each station and positively identified upon entry and departure for convenience and security. The wireless identification tag security system preferably includes interrogation software, tags, protocols, and database tracking software.

The wireless identification tags and interrogation terminals preferably communicate over the wireless node network, which is designed to operate in security sensitive and/or hostile environments. The network preferably provides multiple redundant paths for tolerance to damage and faults, as well as resistance to detection, jamming, and interception.

If a station is compromised, additional data encryption preferably prevents the possibility of unauthorized intrusions into the data stream. The system is preferably self-diagnostic and self-encoding from ticketing at check-in to the baggage claim level.

Wireless Identification System

FIG. 1 is a block diagram of the monitoring system 10 formed in accordance with the present invention. One or more control stations 12 facilitate an operator's interface to an individual's information and the monitoring system 10. The control station 12 preferably includes a keyboard, display, and audio/video equipment, which interface to the wireless identification communications subsystem, the wireless node communications network, distributed tracking and control systems 14, and a database computer 22. The control station 12 also preferably includes a low sensitivity wireless identification tag receiver and a wireless identification tag interface unit for entering and modifying stored data and interrogation capabilities.

One or more interrogators 16 preferably provide secure pseudo random transmissions to active wireless identification tags 18 and reception of wireless identification tag responses through the wireless communication subsystem. The interrogators 16 preferably receive active wireless identification updates and commands and transmit wireless identification tag responses, status, and location information via the wireless node network and the tracking and control system.

One or more display stations 20 preferably provide guests with a display and/or audio interface for obtaining guest-relevant information. Each display station 20 preferably includes an interrogator and a low sensitivity wireless identification tag receiver for sensing tags at or near the station. The display station 20 preferably obtains information relevant to the detected tags from the tracking and control system 14 and displays this information to the guests.

The database computer 22 preferably maintains a copy of the guest and information databases from the hotel or airline reservation computer and augments it with information unique to the monitoring system. The database is then preferably correlated with actual guest check-in information, and specific guest data items, such as digitized video images. This information is preferably available on-line in the monitoring system for predetermined periods of time.

The database computer 22 preferably interfaces with the monitoring system 10 using the wireless node network and the distributed tracking and control system 14. The database computer 22 preferably interfaces to an existing hotel or airline reservation computer equipped with processing and communication interfaces. System interface of the reservation system with the database computer is preferably implemented by providing a dedicated wired or wireless link 24.

The distributed tracking and control system 14 preferably manages system control information, such as active wireless identification tag locations, tracking updates, tag activation/deactivation commands, and status information. The tracking and control system 14 preferably correlates tag information from the control stations 12, interrogators 16, display stations 20, tag locator/controllers 26, and tracking history, as well as reporting tracking status to the database computer 22.

The wireless node network preferably provides redundant wireless communication network links throughout the monitoring system 10. In addition, the wireless node network preferably provides secure LAN/WAN interface(s) to other terminals, as well as remote terminals not shown in FIG. 1.

The monitoring system 10 preferably provides a wireless communication link between wireless identification tags 18 and the control stations 12, interrogators 16, display stations 20, and tag locator/controllers 26. Antennas at the control station 12, interrogator 16, display station 20, and tag locator/controller 26 preferably include spatial diversity, polarization diversity, and/or directionality to minimize fading of the tag signals.

Portable wireless identification tags 18 preferably enable reception of interrogation codes from interrogators 16 or tag locator/controllers 2, and on-board code comparison and transmission of the tag response code after identification of its interrogation code to the interrogating source. The wireless identification tags 18 preferably conserve battery power by shutting down in a sleep mode during periods of inactivity, as well as during a majority of the time between interrogations.

The wireless identification tags 18 preferably provide a low radiated power mode and an active/inactive mode. The low radiated power mode is preferably activated by the interrogators 16, control stations 12, display stations 20, and tag locator/controllers 26 through the wireless identification tag communication subsystem. The tags 18 also preferably include a provision for activation/deactivation, data and information (such as visual images, flight information, physical characteristics, reservation information, and accommodation information) storage, read out, and modification through a wireless identification tag interface unit at the control stations 12 and tag locator/controllers 26.

The control stations 12, interrogators 16, and display stations 20 preferably provide for an ambulatory mode of operation, in which these stations may readily be moved around the facility. This feature advantageously enables system resources to be deployed to suit changing requirements and day-to-day security considerations.

Another embodiment of the monitoring system in accordance with the present invention includes wireless identification tags 18 in a squawk mode. Such a system preferably includes the following:

a display station 20 that listens for wireless identification tag transmissions and reports the presence of tags detected on the display or to the track and control system 14 and wireless node network; and wireless identification tags 18 having diverse transmission pulse repetition frequencies (PRF) without receive capabilities or tags 18 operating in a squawk mode. In the squawk mode the wireless identification tags 18 preferably transmit a squawk signal including at least a portion, of the information in the tag at assigned PRF while the display station 18, tracking and control system 14, and communication system process responses from squawking tags and those from transceiver-based wireless identification tags.

Interrogator

Figure 2:
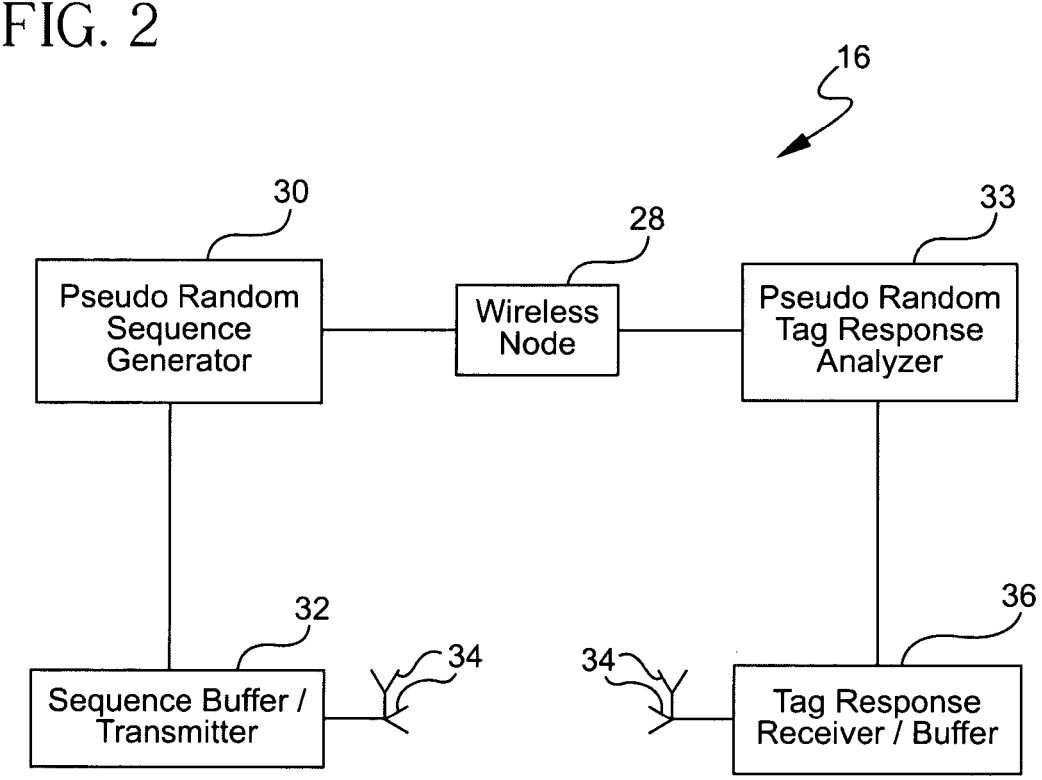
FIG. 2 is a block diagram of an interrogator for use in the system shown in FIG. 1.

FIG. 2 is a block diagram of the interrogator 16 for use in the system formed in accordance with the present invention. Interrogators 16 are preferably distributed throughout operational areas to track wireless identification tags 18. One or more wireless MicroNodes™ preferably link the interrogator 20 to the MicroNode™ or equivalent wireless network, tracking and control system 14, and database computer 22. A sequence generator 30 preferably prepares an updated list of active tags in a pseudo random ordered packet, which is buffered for wireless transmission to the tags in a sequence buffer/transmitter 32. A tag response analyzer 33 preferably processes the buffered pseudo random block of wireless identification tag responses from a tag response receiver/buffer 36 and reports the status of tag responses to the distributed track and control system 14 shown in FIG. 1 through the wireless node 28.

Advantages of the network, distributed track and control, and interrogation are redundancy, communication backup, and two or more interrogation sources providing track and control inputs that minimize portable signal blockage and local interference. The interrogators 16 preferably include spatial diversity, polarization diversity, and/or directional antennas 34, and may be utilized at fixed or ambulatory locations.

The interrogation sequence is preferably pseudo random and may include a transmission pause between individual identification codes for the receipt of pseudo random response transmissions by the tags. An alternative sequence may include an uninterrupted burst transmission of the identification codes for all active tags in pseudo random order followed by an uninterrupted listening window for response transmissions from the wireless identification tags in pseudo random order. Which of these techniques is used is preferably determined by the number of tags that require monitoring. Thus, the system is advantageously able to efficiently monitor large quantities of wireless identification tags without incurring the unacceptable latency found in conventional systems.

The transmitted identification code sequence may be simplified for efficiency and added coding security by code grouping of transmissions. For instance, sending tag code Cn followed by d pn digits, where each digit dpn is an incremental digit to be added or subtracted from Cn, to define another code Cn+dpn or Cn−dpn. By such means, thousands of tags may be interrogated and verified on a single 115 Kbps channel in about 1–2 seconds.

Control Station

Figure 3:
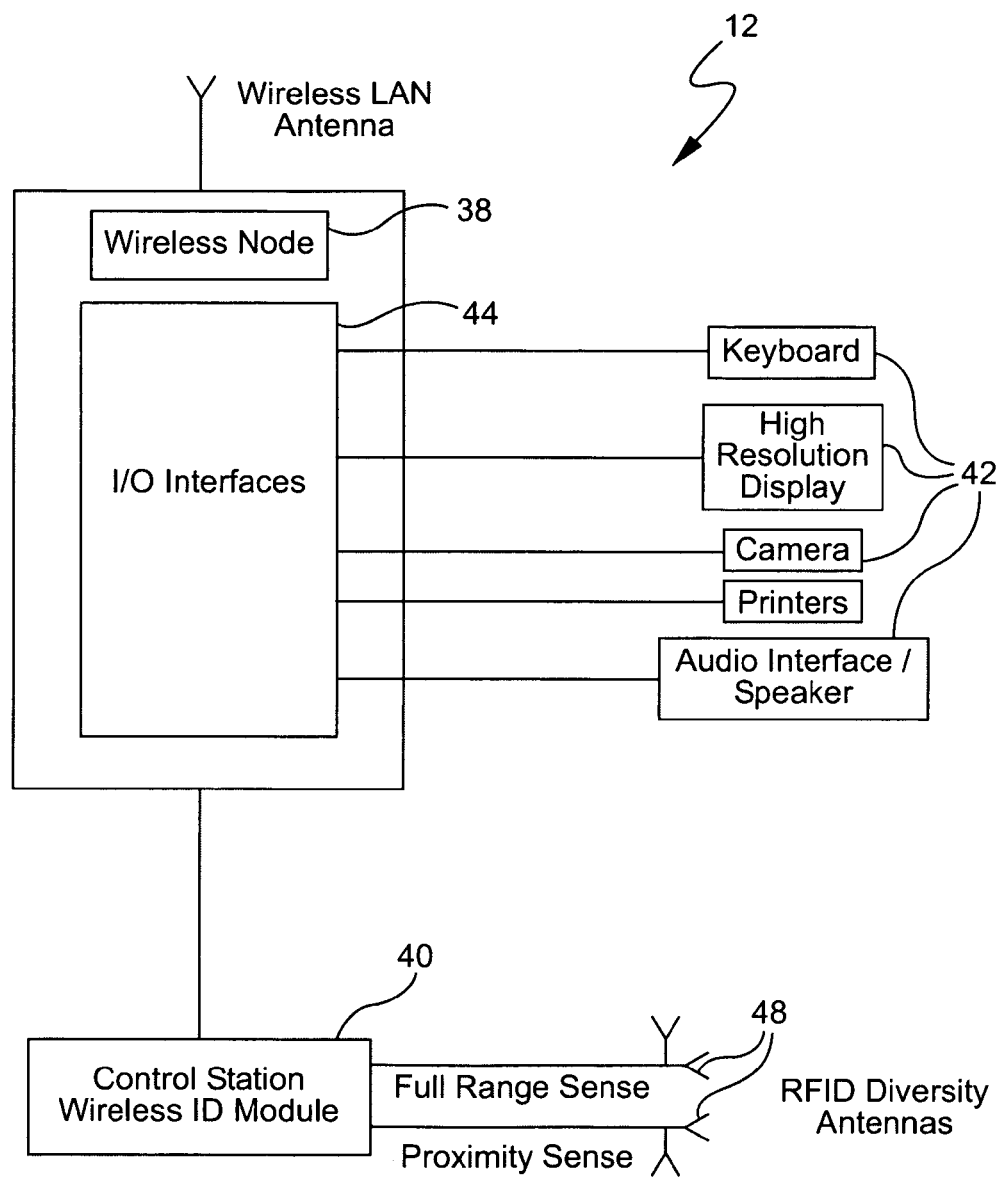
FIG. 3 is a block diagram of a control station for use in the system shown in FIG. 1.

A block diagram of the control station 12 is shown in FIG. 3, which preferably includes a wireless node 38, control module 40, and I/O devices 42 with supporting hardware and/or software interfaces 44. The control station 12 wireless node 38 preferably provides the following functionality and interfaces:

central processing unit;
wireless local area network (LAN) interface and antenna; and
I/O interfaces 44 to a control module 40 and other I/O devices 42.

The control module 40 preferably includes the following:
a wireless identification tag receiver (The control station 12 may be configured with high sensitivity and/or low sensitivity wireless receivers, as required in particular environments. The wireless receiver preferably provides support for a diversity antenna system 48.)
diversity antennas 48 and cabling; and
I/O interface 44 with cabling.

The control station 12 preferably provides the following I/O devices 42:
keyboards;
displays (the control station preferably supports high resolution CRT displays and LCD displays);
video cameras (medium resolution video camera subsystem and interface);
audio interface/speakers; and
printers.

The control station 12 preferably provides the station operator with rapid access to information in the reservation system, the database computer 22, and the tracking and control processing system 14, as shown in FIG. 1, relative to a monitored individual or object, as well as verification information stored on a wireless identification tag 18 attached or assigned to the individual or object. The station 12 also preferably facilitates formation, modification, and termination of active tags, generation of a guest video image, storage of the image on the wireless identification tag, and retrieval of the image from the monitoring system for verification and viewing on the display.

The control station 12 may be deployed at fixed and ambulatory sites and preferably includes spatial diversity, polarization diversity, and/or directional antennas. The station 12 includes a low sensitivity receiver for detection and identification of tags near the station 12, as well as a particular tag within a few feet of the station 12. When a wireless identification tag 18 is detected near the station, a command is preferably generated by the control module 40 and transmitted through the wireless node network and interrogator to the tags. The tag preferably operates in a low radiated power mode momentarily to facilitate its recognition only when within a few feet of the control station 12.

The control of tag power output may be used to identify amplitude modulation (AM) type tags within a few feet of the control station 12. In this embodiment, the station 12 preferably includes a full-range receiver and a low-sensitivity receiver for tag detection and monitoring within about 25 feet. When a tag is within the field of the full-range receiver, the control station 12 preferably switches to short range. This ensures that the tag is only detected within a few feet of the station and can then be selected at the control station 12 for display and positive identification by the operator.

For simple tags, a power level control gate with a resistive-capacitive (RC) timer preferably switches the tag between full-range mode which is preferably about 320 feet from the full-range receiver and about 25 feet from the low-sensitivity receiver, and short range mode, which is about 3 to 6 feet from the low-sensitivity receiver.

For amplitude modulated transceiver tags, the low-sensitivity receiver preferably monitors all tags within about 25 feet. The interrogator 16 shown in FIG. 1 preferably sends a power level control signal to all tags 18 identified by the low-sensitivity receiver. This signal preferably causes these tags to enter the low power mode so that only tags within a few feet of the control station 12 will be detected and a selected image and associated data displayed to the operator.

Wireless Identification Tag

Figure 4:
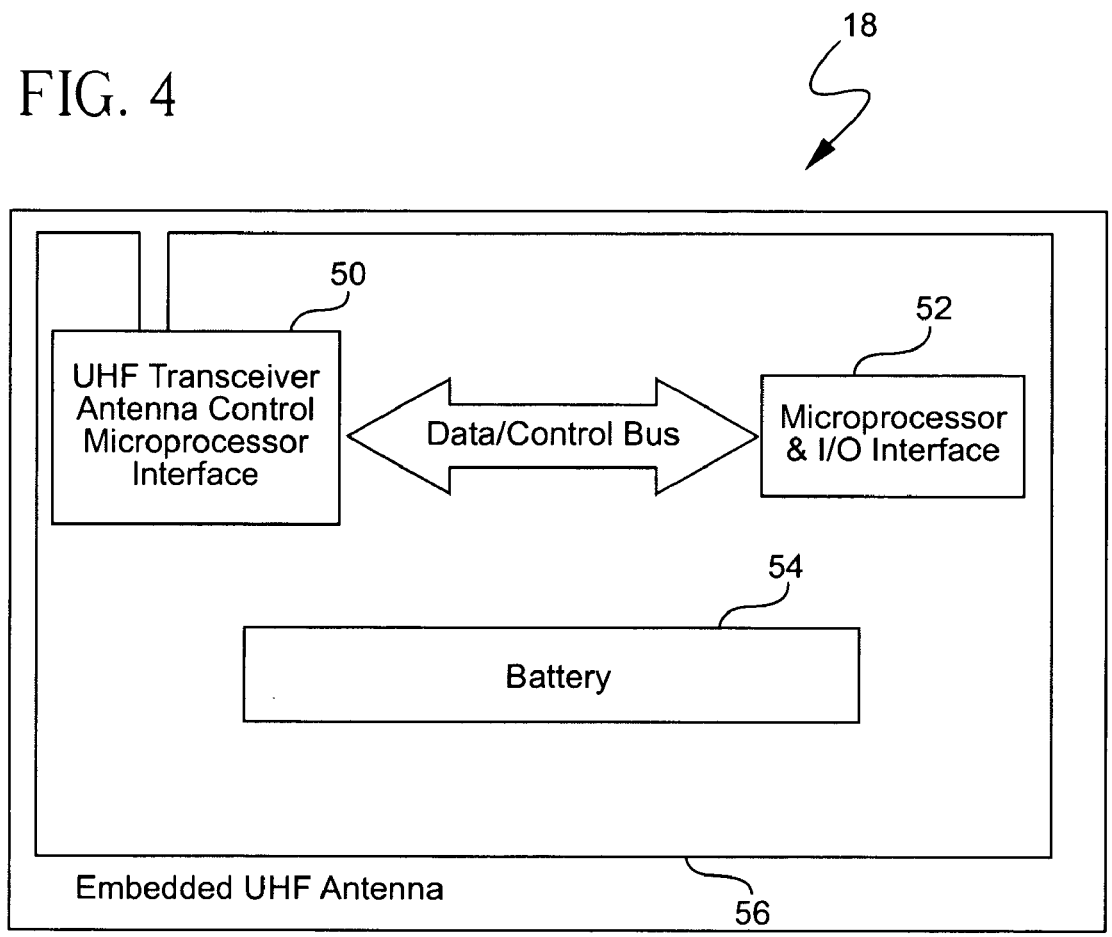
FIG. 4 is a block diagram of a wireless identification tag for use in the system shown in FIG. 1.

FIG. 4 is a block diagram of the wireless identification tag 18. The tag 18 preferably includes an ultra high-frequency (UHF) transceiver 50 and a microprocessor circuit 52, such as a microprocessor, microcontroller, application specific integrated circuit (ASIC), gate array, or programmable logic device, and memory (not shown) in one layer of a credit card-size circuit board, a loop antenna 56 etched or deposited on another layer of the circuit board, and a battery 54, which may be embedded in the circuit board. Alternatively, the circuit board and a replaceable battery may be mounted in a housing that facilitates battery replacement. The UHF transceiver 50 and microprocessor 52 may be separate integrated circuits or implemented together as a single monolithic chip.

The transceiver 50 preferably includes a discrete actuator under the control of the microprocessor 52 and wireless communication subsystem, which can place the transceiver in the low-radiated power mode for a short time, such as about 10 seconds, after which the transceiver 50 automatically resets to full-radiated power mode. To enter the low power mode, the actuator preferably provides an input bias or a power shutdown gate to the transmitter 50 or gates out the transmitter coupling to the antenna 56. The low power mode is preferably operative when the tag is at or near a control station 12, display station 20, or tag locator/controller 26 shown in FIG. 1.

The wireless identification tag 18 preferably also incorporates the following features:
- an activate/deactivate circuit, which preferably connects or disconnects the battery from the wireless identification tag 18 (the tags 18 may be activated or deactivated by the control stations 12, tag locator/controllers 26, and interrogators 16);
- a frequency channel is preferably selected and assigned at the control stations 12 or tag locator/controllers 26; and
- a battery saving duty cycle mode preferably selected at the control stations 12 or tag locater/controllers 26 (This mode automatically disconnects the wireless identification tag circuitry for the majority of the interval between tag interrogation/response update cycles. An RC timing or counter circuit is preferably energized during the battery disconnect interval, which enables battery life to be significantly extended, e.g., 10 times that of continuous use).

Figure 7A:
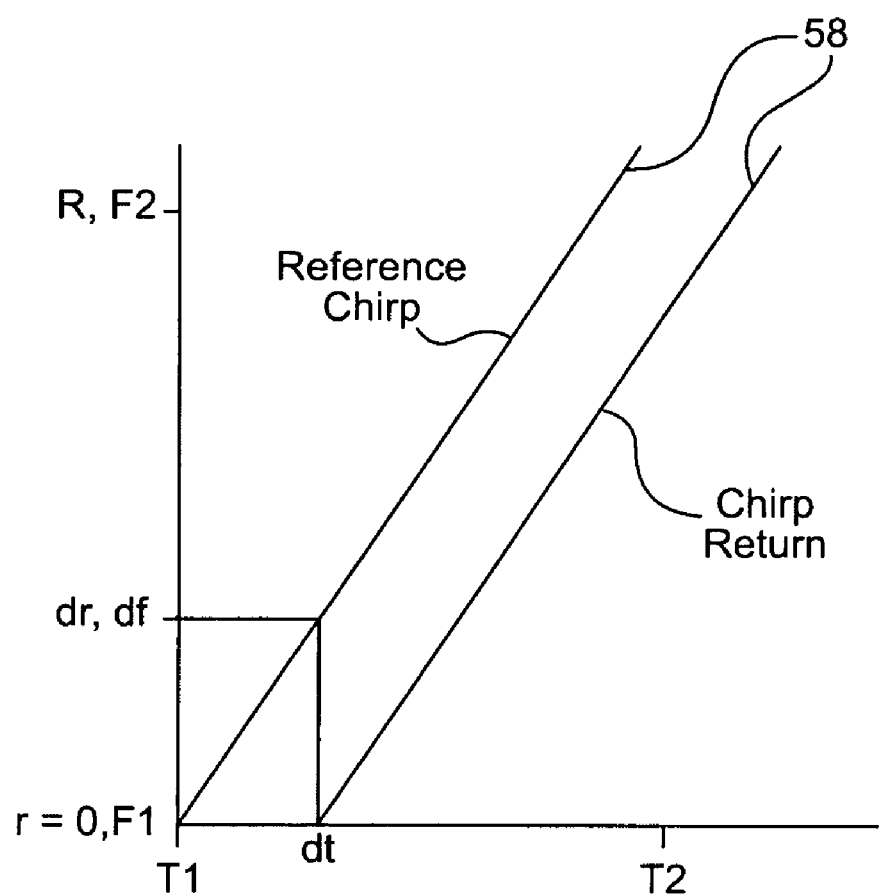
FIG. 7A is a graph of frequency as a function of time for signals used in the interrogation and response of wireless identification tags.

One embodiment of the wireless identification tag includes circuitry for ranging. Range measurement enables the precise location of an individual or object and permits identification of an individual approaching a station, as well as those in a queue line in the vicinity of a display, or near a hand-held location/control device or checkpoint. A graph of frequency as a function of time for signals 58 that may be used in wireless identification tag ranging is shown in FIG. 7A. Upon receipt of its interrogation code including a range measurement command bit, the wireless identification tag 18 preferably repeats a linear FM (LFM) signal 56 received from the interrogator 16 on a second channel and automatically terminates this repeat function at the end of the FM signal reception. Referring to FIG. 7a and assuming the following parameters:
- chirp duration=$T_2-T_1=dT=1$ ms;
- chirp excursion=$F_2-F_1=dF=32.0$ Khz;
- maximum number of range bins=32;
- two-way propagation time=$tp=2$ ns/ft;
- chirp time resolution=$dt=2r=20$ ns;
- chirp frequency resolution=$df=1$ KHz;
- unambiguous sampling rate=$2R/dT=64$ K; and
- samples/sec=32, a range resolution of about 10 feet and a maximum unambiguous range of about 320 feet from the selected wireless identification tag is achieved by using a Fourier transform or similar analysis on 64 samples of reference chirpless returns. Since the processing is performed at the interrogator 16, higher resolution may be achieved with little additional complexity to the wireless identification tag. For instance, a Fourier analysis of 256 real samples on the above-identified parameters yields a range of about a 2.5 feet, which is adequate, for instance, for selecting a piece of luggage from a loaded cargo bay.

Another embodiment preferably employs duplex operations wherein the wireless identification tag 18 is set at the control station 12 or tag locater/controller 26 to permit simultaneous transmission and reception of data, instrumentation, and/or voice communication. Squawking wireless identification tags that include a squawk mode or can only transmit on a continuous basis without regard to interrogation sequences may also be used. In addition, standard wireless identification tags, which are operational transceivers, may include a squawk mode, in which the tag receiver is deactivated and the transmitter squawks assigned codes at pre-determined pulse repetition frequency (PRF) rates, thereby functioning as beacon transmitters.

Display Station

Figure 5:
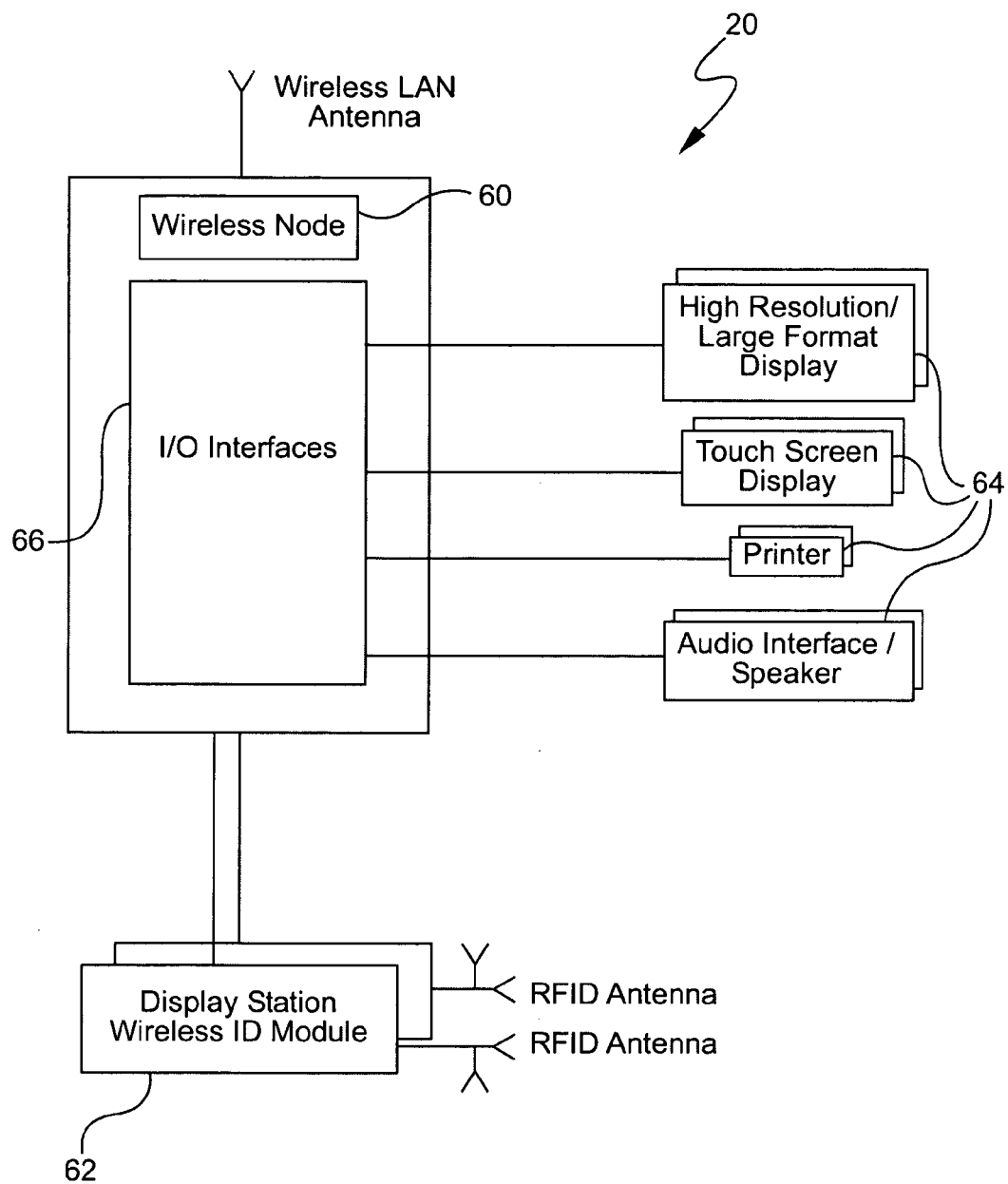
FIG. 5 is a block diagram of a display station for use in the system shown in FIG. 1.

The display station 20 shown in FIG. 5 preferably includes a wireless node 60, display module 62, and I/O devices 64 with supporting hardware and software interfaces 66. The display station 20 may be configured for concurrent access by multiple guests.

The display station wireless node 60 preferably provides the following functionality and features:
- a central processing unit;
- a wireless LAN interface and antenna; and
- I/O interfaces for the display module 62 and I/O devices 64.

The display station module 62 preferably includes a wireless identification tag transceiver with a low sensitivity mode that enables access by the guests at or near the station 62. The station 20 may be configured with multiple displays 64 including a large screen for those near the station and one or more sensing antennas and displays for individual guest use. Antennas and cabling preferably include wireless node I/O interfaces and cabling.

The display station 20 preferably includes the following I/O devices:
- displays including high-resolution CRT displays, LCD displays, touch-screen displays, and customized large format displays;
- printers; and
- audio interface/speakers.

The display station 20 preferably provides a highly configurable guest information kiosk facility for individuals at, for instance, hotels and airports. Individuals are able to access the system to display information relevant to the tag carried by the individual. Individuals near the station are automatically able to read relevant data on a large screen, which is updated as the individual approaches. The individual's tag is preferably commanded into the low-radiated power mode when detected near the station 20, which limits the low sensitivity antennas at the display station 20 so that only those tags in close proximity to the station 20 are detected.

The display station 20 preferably queries the database computer through the wireless node network. Detailed query results are preferably displayed only for those individuals located at a corresponding high-resolution display. The information displayed preferably includes customary guest information, such as room, flight or gate number and conference or boarding time. The station 20 may be configured to show other information, such as conference or connecting flight information. The display station 20 also preferably provides specific directions, such as maps showing the individual's current location and routes to facilities or destinations.

The display and associated data corresponding to a specific individual is preferably cleared as the individual exits the vicinity of the display station 20. The system preferably supports special services, such as individual paging, urgent messages, and general hotel or airline messages and advertising. A touch-screen display equipped display station 20 is preferably configured to provide a menu of services for the individual, such as connecting flight information, in addition to display and printing capabilities. The display station 20 may be deployed at fixed and/or ambulatory locations.

Wireless Identification Tag Locator Controller

Figure 6:
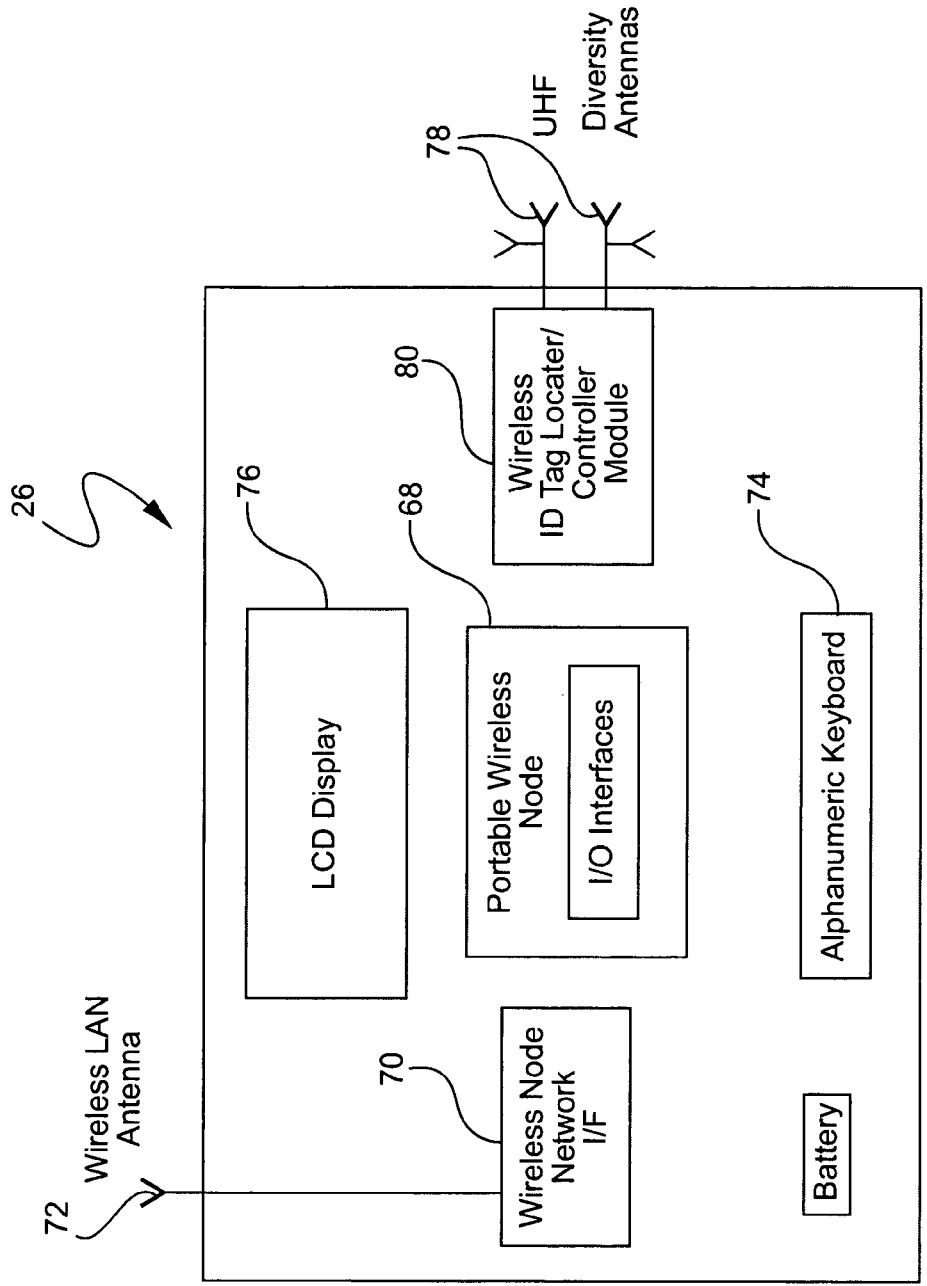
FIG. 6 is a block diagram of a portable wireless identification tag locator/controller for use in the system shown in FIG. 1.

The wireless identification tag locator/controller (TLC) 26 is shown in FIG. 6 and is preferably a hand-held special-purpose portable computer and wireless communicator, which includes the following:

- wireless node 68 including a programmable CPU, static random access memory (RAM), I/O buses, and ports;
- wireless node wireless interface 70 including radio and antenna 72 that provide access to the wireless node network;
- high resolution video/alphanumeric keyboard 74;
- display 76; and
- wireless identification tag wireless interface including a UHF radio, diversity antennas 78, and control/data module 80, which provides links to the selected wireless identification tags.

The portable tag locator-controller (TLC) 26 preferably provides a field operator with a facility to search and locate particular wireless identification tags 18. The TLC 26 is preferably programmed at a control station 12 or a field location. The TLC 26 may have limited access to information in the wireless network, which is based on the operational requirements of the hotel or airline. The TLC 26 preferably enables two-way data verification and confirmation as a portion of its protocol.

The TLC 26 is preferably designed to provide rapid location, control, and modification of particular wireless identification tags, such as locating unaccompanied or lost baggage, tag deactivation, and tag/guest verification. The TLC 26 is preferably configurable by the operator in terms of short and long range capabilities and the selection of diversity and directional antennas.

Short range interrogation code transmissions are preferably generated for a selected tag, the tag responds to the interrogations, and the response is detected by the TLC 26. The TLC 26 then preferably repeats the interrogation with a low radiated power command bit, which upon detection by the wireless identification tag, sets the tag in the low radiated power mode. In this mode, tracking of the tag by the monitoring system is interrupted unless the tag is also within a short range of one of the interrogators.

The TLC 26 preferably continues interrogation, but will not detect tag response transmissions until the TLC 26 is within a very short range, such as about 2 to 4 feet of the tag. If the TLC 26 does not detect the tag again for a few seconds, such as about 10 seconds after commanding the tag into the low power mode, the tag automatically resets itself to full power mode and is then detected by the interrogator 16, which enables timely updates of tag tracking by the system.

In very short-range detection scenarios, the TLC 26 preferably commands read out of the tag stored data including tag owner information, such as the video image of the individual, which may be compared by the operator to a TLC stored image of the tag's owner. The operator may also command the tag to enter the inactive mode, collect the tag, and/or terminate interrogation of the tag, and enable the tag to return to full power operation.

For security, as well as time continuity of tracking, the tag preferably continues to automatically reset itself to high-power mode every few seconds while in very short range of the TLC 26. The TLC preferably continues commanding the tag into low power mode upon redetection of the tag full power mode. Prior to terminating very short range operations, a TLC identifier code and time are preferably added to the tag memory and a tag identifier, status, and time record are preferably stored in the TLC 26.

Figure 7B:
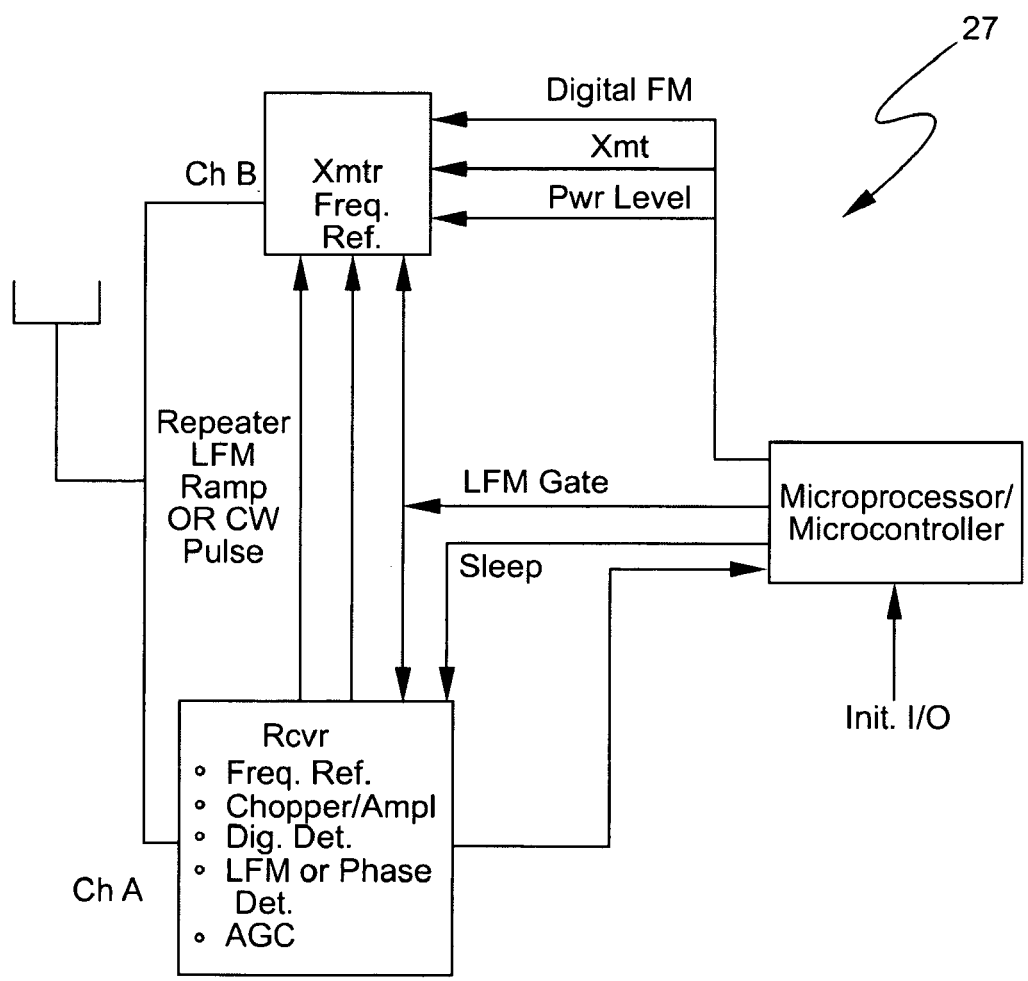
FIG. 7B is a block diagram of a full duplex wireless identification tag transceiver formed in accordance with the present invention.

A preferred approach to ranging wireless identification tags is a system that includes an interrogation station 27, which is preferably equipped to transmit a continuous wave (CW) pulse at a second frequency, as shown in FIG. 7b. The wireless identification tags preferably receive the CW pulse from the interrogator 27 and retransmit the CW pulse at the tag transmit frequency. The interrogator 27 preferably takes several samples of the signal at one or two intermediate frequencies. For short ranges of under a few hundred feet, a single intermediate frequency is sufficient. For ranging over several hundred to several thousand feet, the interrogator preferably uses a second intermediate frequency, which is relative prime to the first intermediate frequency. This enables use of the Chinese Remainder Theorem to resolve ambiguities over multiple PRF ranges of operation, and essentially form the equivalent of a long-range continuous wave radar.

The Chinese Remainder Theorem is the name applied to a number of related results in abstract algebra and number theory. The original form of the theorem, contained in a book by the Chinese mathematician Ch'in Chiu-Shao published in 1247, is a statement about simultaneous congruences. For instance, if $n_1, \ldots, n_k$ are positive integers, which are pairwise coprime (meaning $\gcd(n_i, n_j)=1$, whenever $i \neq j$), then, for any given integers $a_1, \ldots, a_k$, there exists an integer x solving the following equation (1) representing simultaneous congruences:

$$x \equiv a_i (\bmod n_i) \text{ for } i=1 \ldots k \qquad (1)$$

All solutions x to this system are congruent modulo the product $n = n_1 \ldots n_k$. Further detail concerning the theorem is provided in S. A. Fulling, *Large Numbers, the Chinese Remainder Theorem, and the Circle of Fifths*, Jan. 27, 2001, which is incorporated herein by reference.

For example, assuming two intermediate return frequencies where the first is divisible by 7 and the second is divisible by 11, a matrix of the averaged sample of a pulse may be represented as the following:

$$\begin{matrix} 1;1 & 1;2 & \ldots & 1;11 \\ 2;1 & & & \\ ; & & & \\ ; & & & \\ ; & & & \\ 7 & 7;2 & \ldots & 7;11 \end{matrix}$$

This representation permits mapping of the pulse samples over seven times the PRF of the higher frequency signals and, in this instance, provides resolution of a return phase to about a 360 degree/11=32.78 degree bin. Subsequent resolution within a bin is possible to about 4 degrees. In this example, if the higher PRF is 1.1 MHz, resolution to about a 32.78 degree bin corresponds to a range resolution of 1/1.1 MHz×32.78/360 degrees=82.78 nsec or about 41.4 feet. An 8/1 resolution of the bin results in 41.4/8=5.1 foot range resolution. Several samples of the two intermediate frequency channels are preferably taken and averaged over the pulse with each sample taken at the higher channel sample rate and the phase difference between averaged samples of the two channels is entered in the matrix for phase/range ambiguity resolution.

Wireless Identification Tag Transmitter and Receiver

Figure 8A:
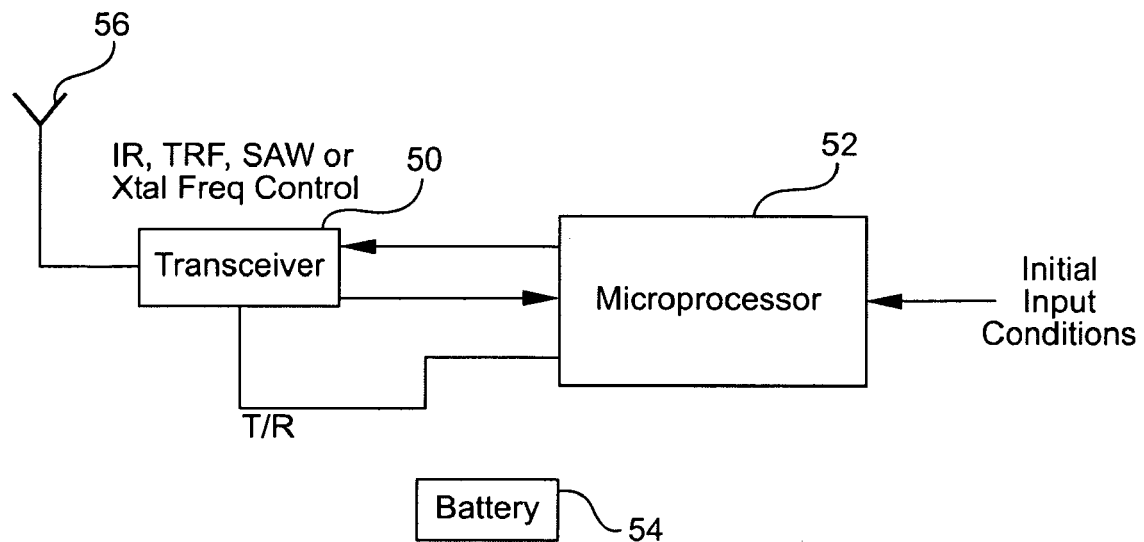
FIG. 8A is a block diagram of the wireless identification tag implemented as a single monolithic device.
Figure 8B:
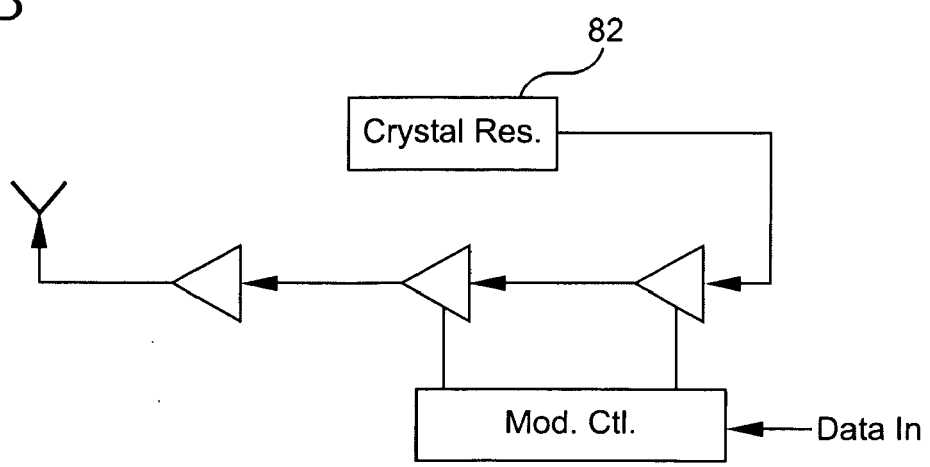
FIGS. 8B and 8C are block diagrams of alternative embodiments of the wireless identification tag transmitter.
Figure 8C:
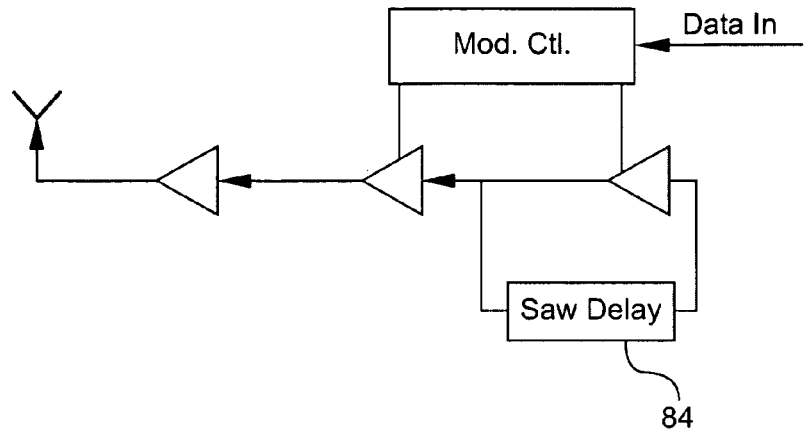
Figure 8D:
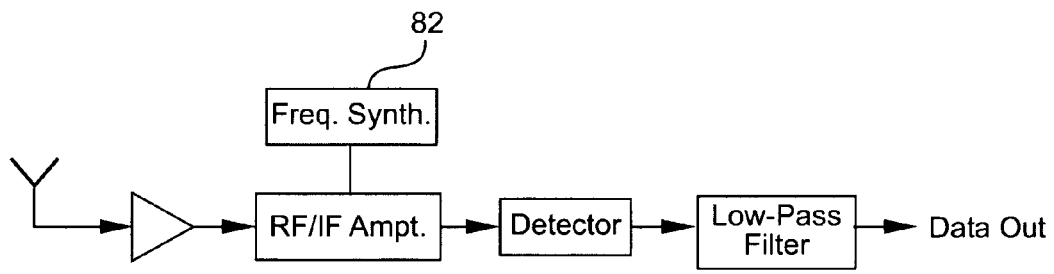
FIGS. 8D and 8E are block diagrams of alternative embodiments of the wireless identification tag receiver.
Figure 8E:
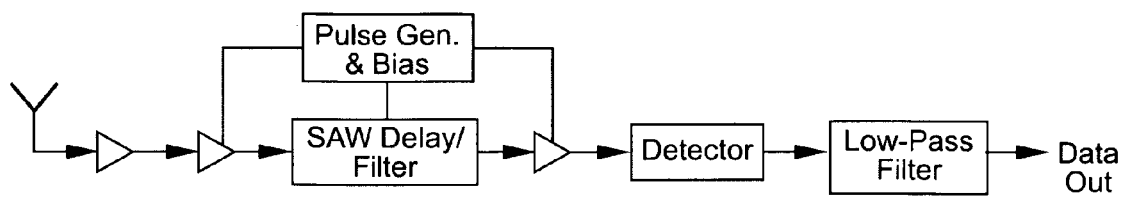

FIG. 8A is a block diagram of an embodiment of the wireless identification tag 18. The wireless identification tag 18 preferably includes the transceiver 50 and microprocessor 52, which may be implemented as a single monolithic device having a separate battery 54 and control interfaces. Alternative transceiver embodiments for the tag 18 are shown in FIGS. 8B–E, which include the following:

- a crystal controlled frequency synthesizer 82 for both the transmitter and receiver with a superheterodyne radio frequency (RF) and intermediate frequency (IF) receiver amplifiers, as shown in FIGS. 8B and 8D; and
- a surface acoustic wave (SAW) delay line RF filter 84 for both the transmitter and receiver with a chopped delay amplifier to achieve high receiver sensitivity without oscillation or spurious radiation, as shown in FIGS. 8C and 8E.

The frequency synthesizer 82 embodiments shown in FIGS. 8B and 8D permit precise crystal frequency control at the cost of complex synthesis, frequency conversion, and rejection of spurious radiation and unwanted signals. The SAW delay line 84 embodiments shown in FIGS. 8C and 8E are simpler, require no frequency conversion, do not generate spurious interference or require frequency rejection, and achieve receiver sensitivity comparable to the superheterodyne receiver. However, SAW control of transceiver frequency is not as well defined as crystal frequency control. In addition, such as transceiver requires a relatively wider frequency bandwidth than the information bandwidth to compensate for variations between SAW devices, temperature sensitivity, and the like.

Figure 9:
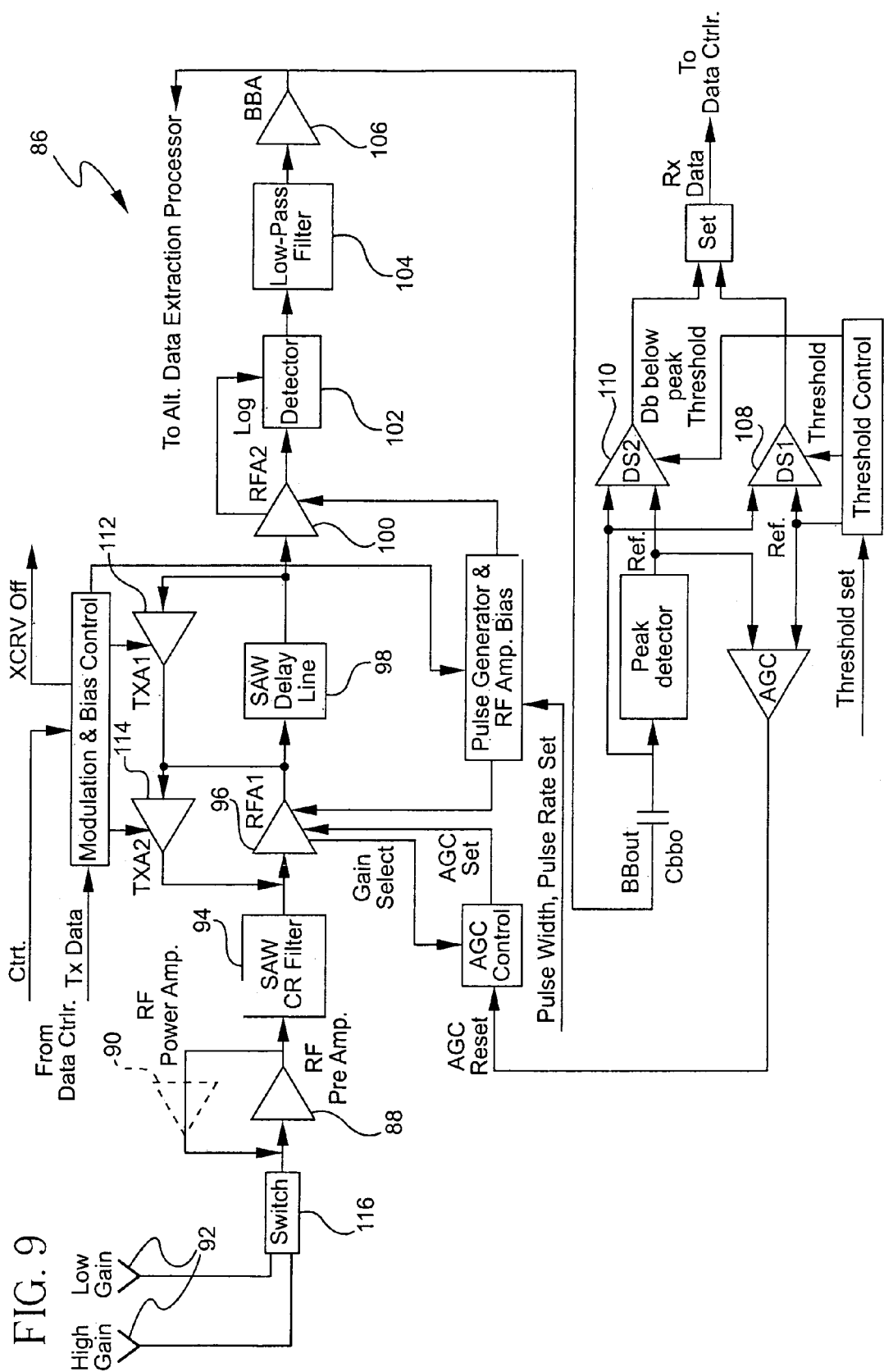
FIG. 9 is a block diagram of ultra high frequency (UHF) transceiver using a surface acoustic wave (SAW) delay line-based sequenced receiver amplifier.

An alternative embodiment of a wireless identification tag transceiver 86, which uses a separate hybrid transceiver device, is shown in FIG. 9. The transceiver preferably supports data transmission with on-off-keyed (OOK) modulation at 19.2 Kbps or amplitude shift keyed (ASK) modulation at 115.2 Kbps over a dynamic range of 100+ dB.

An external preamplifier 88 is shown in FIG. 9 that preferably ensures −98 to −100 dBm receiver sensitivity with 115.2 kbps ASK. An optional external RF power amplifier 90 is preferably used for higher radiated power applications. The antenna system preferably provides selectable high-gain/low-gain antennas 92. Receiver sensitivities of −100 dBm are preferably used for longer range applications. The receiver path preferably includes the antenna 92, antenna matching/protection circuit 116, preamplifier 84, on-chip SAW filter 94, pulse gated RF amplifier RFAI 96, SAW delay line 98, pulse gated RF amplifier RFA2 100, detector 102, low pass filter 104, and baseband amplifier 106, which is fed externally to a data recovery process on a separate microprocessor, or fed through on-chip amplifier DS1 108 or DS2 110 (depending on signal level) to an external data buffer associated with the microprocessor.

The transmitter path preferably includes RF amplifier TXA1 112 and a SAW delay line 98 in a feedback loop to form the transmitter oscillator, transmitter RF amplifier TXA2 114, SAW filter 94, antenna matching circuitry 116, and antennas 92. In OOK modulation mode, both amplifiers are preferably turned on and off for 1 and 0 data bits, respectively. In ASK mode, the oscillator amplifier TXA1 112 is preferably biased to be continually on, and the power amplifier TXA2 114 is preferably modulated to provide two discrete transmitter output power levels.

Interrogator Transmitter

Figure 10:
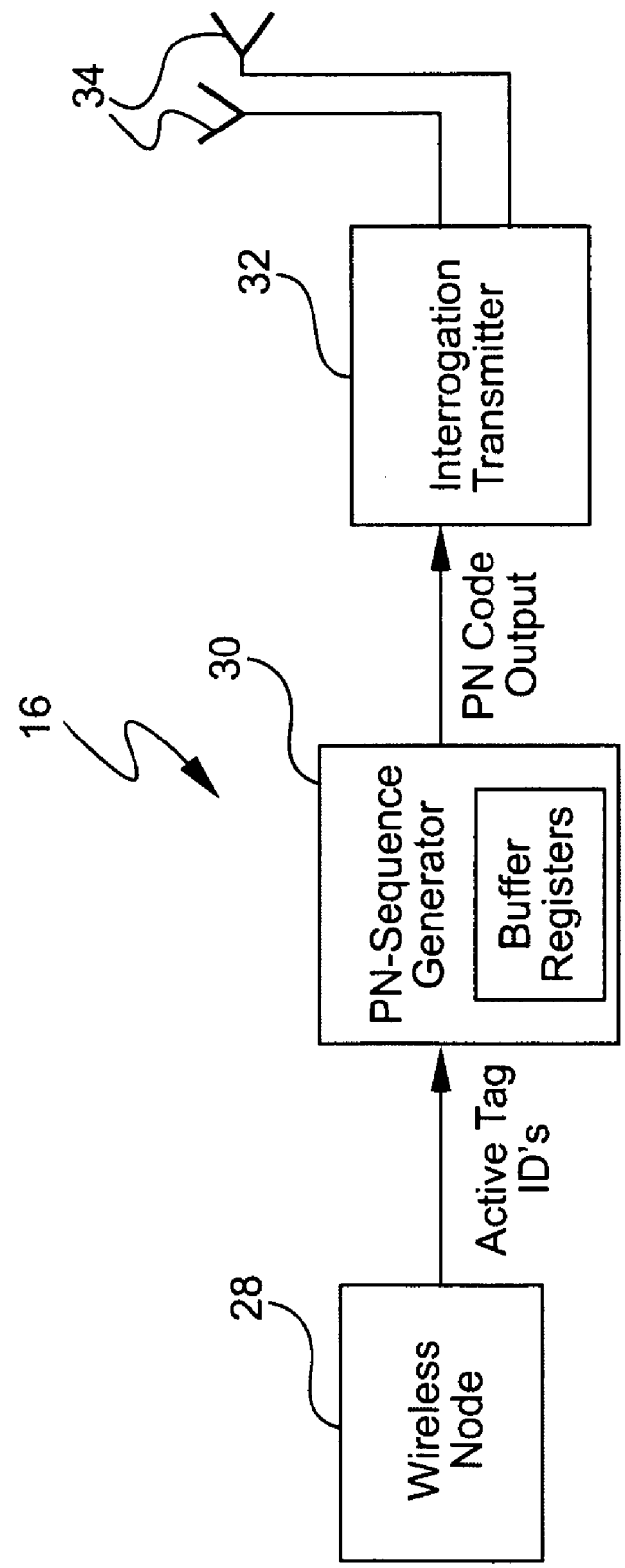
FIG. 10 is a block diagram of an embodiment of the interrogator formed in accordance with the present invention.

FIG. 10 is a block diagram of the transmitter portion of the interrogator 16 shown in FIG. 2. The pseudo random number (pn) sequence generator 30 shown in FIG. 10 is a special-purpose processor that receives an updated list of active tag codes and processes an ordered pn list of the codes for all active tags. This list is buffered and transmitted by the interrogation transmitter 32.

Figure 11:
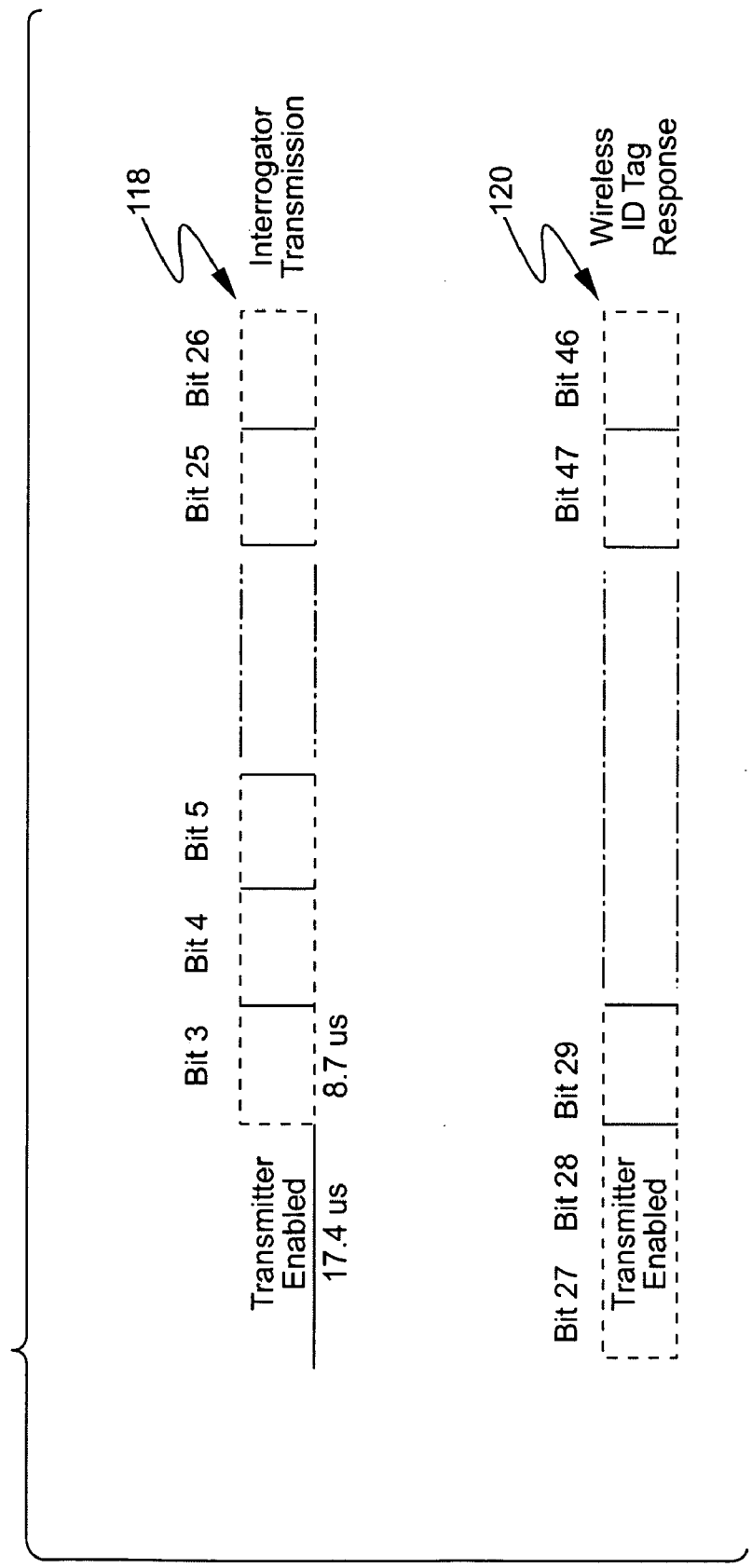
FIG. 11 is a timing diagram of transmission sequences.

The input to the transmitter is preferably a first-in-first-out (FIFO) ordered array of non-return-to-zero (NRZ) codes at 19.2 Kbps using ultra high frequency (UHF) OOK transmission or at 115.2 Kbps using ASK transmission. The wireless identification tags 18 preferably transmit and receive a corresponding form of modulation. ASK modulation is preferably utilized in systems that support thousands of active wireless identification tags 18. Buffer registers 116 are preferably fixed or variable length buffers depending on system operational modes, which affords rapid interrogation and monitoring of a large number of active tags. An example of a transmission sequence, which includes an interrogator transmission 118 and a wireless identification tag transmission 120, is shown in FIG. 11.

Figure 12:
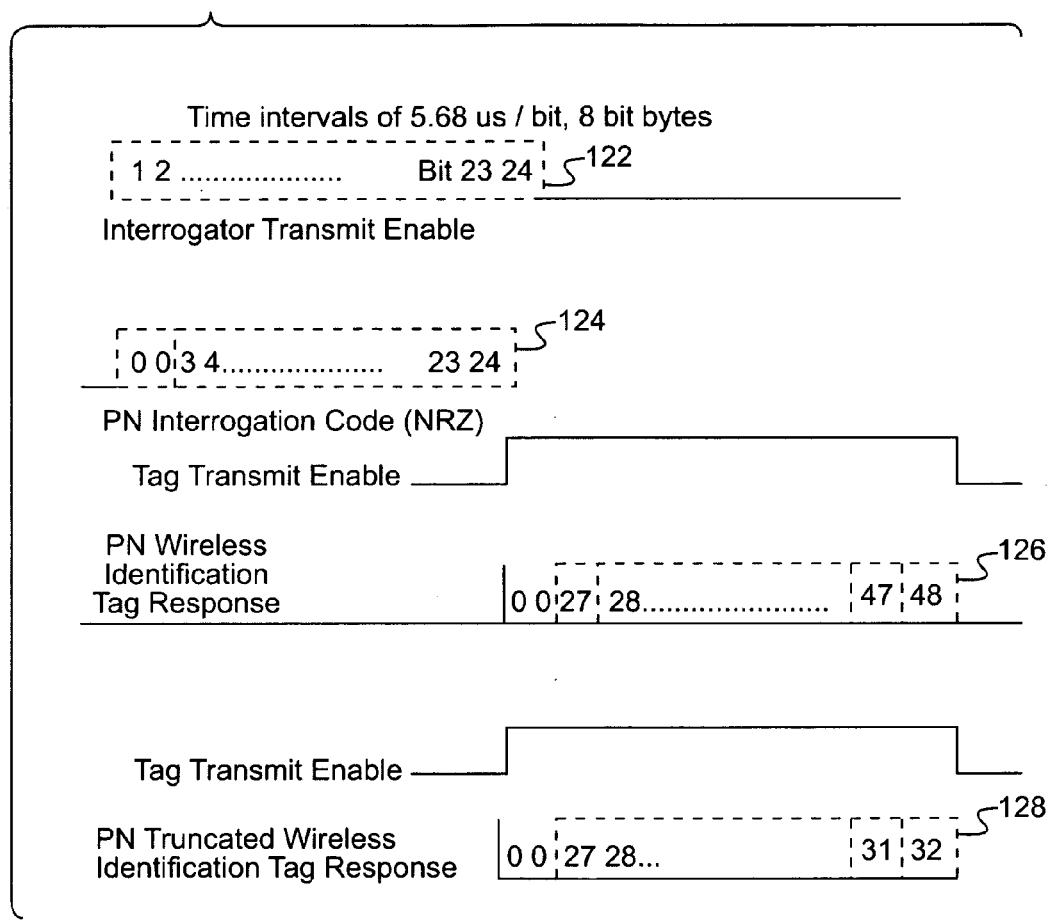
FIG. 12 is a timing diagram of interrogation and verification sequences.

FIG. 12 is an example of a subset sequenced interrogation and verification sequences, in which ASK NRZ modulation is preferably provided at 115.2 Kbps. At 17.4 microseconds after a transmit enable 122, a pn interrogation code 124 of up to 22 bits is preferably transmitted. This may be followed by a transmit disable interval of 1 to 3 bytes (8 bits per byte) depending on whether a full 32-bit response code or a truncated response code is used. The response is preferably an ordered pn sequence and may occur immediately before, after, or with pn spacing from the associated interrogation code 124 transmission. In a truncated response 128 preferably having 32 bit times per interrogation and response, tens of thousands of tags may be monitored and readily updated at a rate of 3,600 tags per second.

Figure 13:
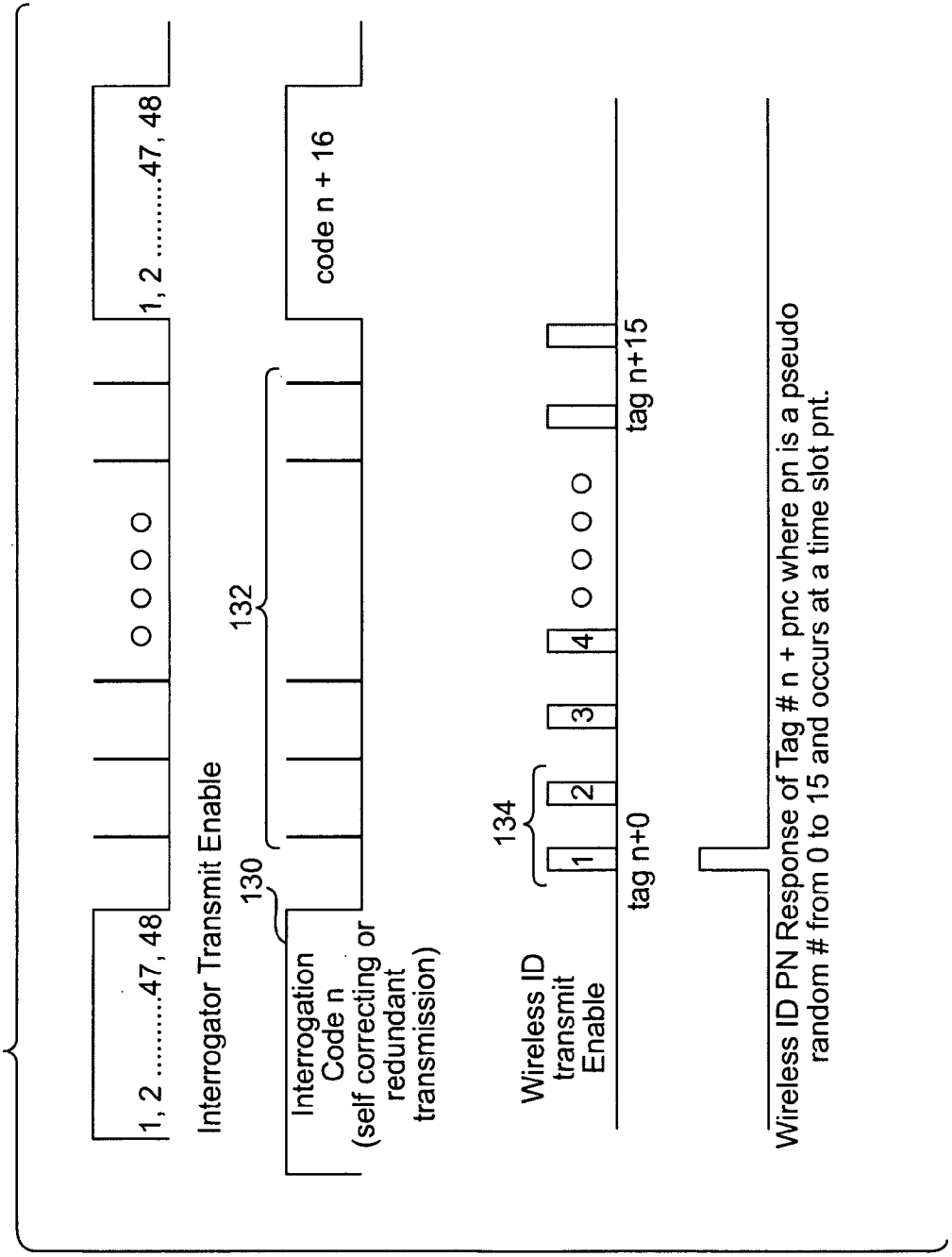
FIG. 13 is a timing diagram of a pseudo random (pn) interrogation sequence.

An example of a pn interrogation sequence e in subsets is shown in FIG. 13. In this example, a substantial reduction in time for interrogation and verification per tag is achieved, which permits rapid updating of a large field of active tags. For instance, a 6 byte (48 bit) self correcting or redundant subset code 130 is preferably transmitted, followed by a 16-byte interval 132, in which the interrogator transmits 16 equally spaced synchronization pulses. Each of the tags addressed by the subset code preferably responds in a pseudo random ordered slot 134 (pnt) with a pseudo random assigned subcode (pnc). In this example, the average time per tag for interrogation and verification is about (6 bytes+16 bytes)/16=1.375 byte intervals. This represents a substantial reduction from comparable interrogation plus verification sequences without subset grouping, which require about 7 byte intervals.

Thus, the method and system formed in accordance with the present invention monitor and track individuals and objects by wirelessly interrogating large quantities of wireless identification tags associated with the individuals or objects using a pseudo random sequence of interrogation codes to determine the existence of the tags and their position within an area, such as a hotel or airport. The system is also able to be selectively programmed according to range and direction of the individual or object in relation to an interrogating source; security features, such as encryption and modification of interrogation codes; and conservation of power during periods of inactivity.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A system for monitoring individuals and objects in an area, the system comprising:
    at least one wireless identification tag, the at least one wireless identification tag including memory, the memory having information stored therein, the information being associated with at least one of a person and object associated with the at least one wireless identification tag; and
    an interrogator, the interrogator wirelessly transmitting an interrogation signal, the interrogation signal including a sequence of interrogation codes, at least one of the interrogation codes being associated with the at least one wireless identification tag, the at least one wireless identification tag wirelessly transmitting an acknowledgment signal in response to receiving the at least one interrogation code associated with the at least one wireless identification tag, the acknowledgment signal being associated with the at least one wireless identification tag, the acknowledgment signal including at least a portion of the information, the interrogator receiving the acknowledgment signal, thereby monitoring at least one of the person and object, the interrogator determining the distance of the wireless identification tag from the interrogator by transmitting a first continuous wave signal, receiving the first continuous wave signal by the electronic identification tag, transmitting a second continuous wave signal by the electronic identification tag until the step of receiving the first continuous wave signal has terminated, sampling the second continuous wave signal at at least one intermediate frequency, and processing the sampled second continuous wave signal using the Chinese Remainder Theorem.

2. A system for monitoring individuals and objects in an area as defined by claim 1, wherein the sequence of interrogation codes is pseudo randomly ordered.

3. A system for monitoring individuals and objects in an area as defined by claim 1, wherein the information associated with at least one of the person and object includes at least one of a visual image, flight information, physical characteristic, reservation information, and accommodation information.

4. A system for monitoring individuals and objects in an area as defined by claim 1, wherein at least one of the interrogation signal and acknowledgment signal is encrypted.

5. A system for monitoring individuals and objects in an area as defined by claim 1, wherein the at least one wireless identification tag includes a sleep mode and an active mode, the at least one wireless identification tag periodically entering the sleep mode to conserve power.

6. A system for monitoring individuals and objects in an area as defined by claim 1, wherein the at least one interrogation code associated with the at least one wireless identification tag is periodically modified.

7. A system for monitoring individuals and objects in an area as defined by claim 1, wherein the information associated with the at least one person and object is modified.

8. A system for monitoring individuals and objects in an area as defined by claim 1, wherein the at least one interrogation code associated with the at least one wireless identification tag is pseudo randomly modified.

9. A system for monitoring individuals and objects in an area as defined by claim 1, wherein the at least one wireless identification tag further comprises a squawk mode, the at least one wireless identification tag wirelessly transmitting a squawk signal while in the squawk mode, the squawk signal including information associated with at least one of the person and object associated with the at least one wireless identification tag, the interrogator receiving the squawk signal, thereby monitoring at least one of the person and object.

10. A system for monitoring individuals and objects in an area as defined by claim 1, wherein the at least one wireless identification tag further comprises a receiver, a transmitter, and a processor, the receiver receiving the interrogation signal, the processor being operatively coupled to the receiver and determining whether at least one of the interrogation codes of the interrogation signal is associated with the at least one wireless identification tag, the transmitter being operatively coupled to the processor and transmitting the acknowledgment signal in response to the processor determining that at least one interrogation code is associated with the at least one wireless identification tag.

11. A system for monitoring individuals and objects in an area as defined by claim 10, wherein the processor includes at least one of a microprocessor, microcontroller, application specific integrated circuit (ASIC), gate array, and programmable logic device.

12. A system for monitoring individuals and objects in an area as defined by claim 1, wherein the interrogator further comprises an interrogation sequence generator, a transmitter, an acknowledgment signal analyzer, a receiver, and a wireless network interface, the interrogation sequence generator generating the sequence of interrogation codes, the transmitter being operatively coupled to the interrogation code generator and transmitting the sequence of interrogation codes sequence, the receiver being operatively coupled to the acknowledgment signal analyzer and receiving the acknowledgment signal, the interrogation code generator and the acknowledgment signal analyzer being operatively coupled to the wireless network interface.

13. A system for monitoring individuals and objects in an area as defined by claim 12, wherein the wireless network interface interfaces to a wireless network, the wireless network providing a wireless communication link between the at least one wireless identification tag and the interrogator.

14. A system for monitoring individuals and objects in an area as defined by claim 12, wherein the interrogator further comprises at least two antennas operatively coupled to at least one of the receiver and transmitter, the at least two antennas including at least one of spatial diversity, polarization diversity, and directionality.

15. A system for monitoring individuals and objects in an area as defined by claim 12, wherein the interrogator further comprises at least two antennas operatively coupled to the receiver, the at least two antennas having different ranges.

16. A system for monitoring individuals and objects in an area as defined by claim 1, wherein the system further comprises a control station, the control station including a wireless network interface, a receiver, and at least one of a keyboard, display, camera, printer, and audio interface/speaker, the wireless network interface being operatively coupled to at least one of the keyboard, display, camera, printer, and audio interface/speaker, the wireless network interface being operatively coupled to the receiver, the receiver receiving the acknowledgment signal from the at least one wireless identification tag, the control station being accessible to authorized persons.

17. A system for monitoring individuals and objects in an area as defined by claim 16, wherein the wireless network interface interfaces to a wireless network, the wireless network providing a wireless communication link between the control station and at least one of the at least one wireless identification tag and interrogator.

18. A system for monitoring individuals and objects in an area as defined by claim 16, wherein the control station further comprises at least two antennas operatively coupled to the receiver, the at least two antennas including at least one of spatial diversity, polarization diversity, and directionality.

19. A system for monitoring individuals and objects in an area as defined by claim 16, wherein the control station further comprises at least two antennas operatively coupled to the receiver, the at least two antennas having different ranges.

20. A system for monitoring individuals and objects in an area as defined by claim 1, wherein the system further comprises a display station, the display station including a wireless network interface, a receiver, and at least one of a keyboard, display, printer, and audio interface/speaker, the wireless network interface being operatively coupled to at least one of the keyboard, display, printer, and audio interface/speaker, the wireless network interface being operatively coupled to the receiver, the receiver receiving the acknowledgment signal from the at least one wireless identification tag, the display station being accessible to the person associated with the at least one wireless identification tag.

21. A system for monitoring individuals and objects in an area as defined by claim 20, wherein the wireless network interface interfaces to a wireless network, the wireless network providing a wireless communication link between the display station and at least one of the at least one wireless identification tag and interrogator.

22. A system for monitoring individuals and objects in an area as defined by claim 20, wherein the display station further comprises at least two antennas operatively coupled to the receiver, the at least two antennas including at least one of spatial diversity, polarization diversity, and directionality.

23. A system for monitoring individuals and objects in an area as defined by claim 20, wherein the display station further comprises at least two antennas operatively coupled to the receiver, the at least two antennas having different ranges.

24. A system for monitoring individuals and objects in an area as defined by claim 1, wherein the system further comprises a database station, the database station including a wireless network interface, a receiver, and at least one of a keyboard, display, printer, and audio interface/speaker, the wireless network interface being operatively coupled to at least one of the keyboard, display, printer, and audio interface/speaker, the wireless network interface being operatively coupled to the receiver, the database station storing the information associated with at least one of the person and object associated with the at least one electronic identification tag.

25. A system for monitoring individuals and objects in an area as defined by claim 24, wherein the wireless network interface interfaces to a wireless network, the wireless network providing a wireless communication link between the database station and at least one of the at least one wireless identification tag and interrogator.

26. A system for monitoring individuals and objects in an area as defined by claim 24, wherein the database station further comprises at least two antennas operatively coupled to the receiver, the at least two antennas including at least one of spatial diversity, polarization diversity, and directionality.

27. A system for monitoring individuals and objects in an area as defined by claim 24, wherein the database station further comprises at least two antennas operatively coupled to the receiver, the at least two antennas having different ranges.

28. A system for monitoring individuals and objects in an area as defined by claim 1, wherein at least one of the interrogation signal and acknowledgment signal further comprises a radio frequency signal.

29. A system for monitoring individuals and objects in an area as defined by claim 1, wherein the object further comprises at least one of luggage, goods, and possessions.

30. A system for monitoring individuals and objects in an area as defined by claim 1, wherein the system monitors at least one of persons and objects in an area including at least one of a hotel, airport, park, facility, office, home, business, building, school, day care center, and apartment.

31. A system for monitoring individuals and objects in an area as defined by claim 1, wherein the interrogator includes a first mode and a second mode, the interrogator transmitting two or more interrogation codes without waiting for the acknowledgment signal in response to the interrogator being in the first mode, the interrogator transmitting one of the interrogation codes and waiting for the acknowledgment signal in response to the interrogator being in the second mode.

32. A system for monitoring individuals and objects in an area as defined by claim 31, wherein the interrogator selectively enters one of the first mode and the second mode in response to the quantity of persons and objects to be monitored.

33. A method of monitoring individuals and objects in an area, the method comprising the steps of:
storing information in a wireless identification tag, the information being associated with at least one of a person and object, at least one of the person and object being associated with the wireless identification tag;
transmitting an interrogation signal wirelessly, the interrogation signal including a sequence of interrogation codes, at least one of the interrogation codes being associated with the wireless identification tag;
receiving the interrogation signal by the wireless identification tag;
determining whether at least one of the interrogation codes of the received interrogation signal is associated with the wireless identification tag;
transmitting an acknowledgment signal in response to determining that at least one of the interrogation codes of the received interrogation signal is associated with the wireless identification tag, the acknowledgment signal including at least a portion of the information;
receiving the acknowledgment signal, thereby monitoring at least one of the person and object; and
determining the distance of the wireless identification tag from a source of the interrogation signal, comprising:
transmitting a first continuous wave signal;
receiving the first continuous wave signal by the electronic identification tag;
transmitting a second continuous wave signal by the electronic identification tag until the step of receiving the first continuous wave signal has terminated;

sampling the second continuous wave signal at at least one intermediate frequency; and processing the sampled second continuous wave signal using the Chinese Remainder Theorem.

34. A method of monitoring individuals and objects in an area as defined by claim 33, further comprising the step of ordering the sequence of interrogation codes pseudo randomly.

35. A method of monitoring persons and objects within an area as defined by claim 33, wherein the information associated with at least one of the person and object includes at least one of a visual image, flight information, physical characteristic, reservation information, and accommodation information.

36. A method of monitoring persons and objects within an area as defined by claim 33, further comprising the step of encrypting at least one of the interrogation signal and acknowledgment signal.

37. A method of monitoring persons and objects within an area as defined by claim 33, further comprising the step of entering a sleep mode periodically in the wireless identification tag to conserve power.

38. A method of monitoring persons and objects within an area as defined by claim 33, further comprising the step of modifying the at least one interrogation code associated with the at least one wireless identification tag periodically.

39. A method of monitoring persons and objects within an area as defined by claim 33, further comprising the step of modifying the at least one interrogation code associated with the at least one wireless identification tag pseudo randomly.

40. A method of monitoring persons and objects within an area as defined by claim 33, further comprising the steps of:
   entering a squawk mode in the wireless identification tag;
   transmitting a squawk signal wirelessly while the wireless identification tag is in the squawk mode, the squawk signal including information associated with at least one of the person and object associated with the wireless identification tag;
   receiving the squawk signal, thereby monitoring at least one of the person and object.

41. A method of monitoring persons and objects within an area as defined by claim 33 wherein an interrogator transmits the interrogation signal, the method further comprising the step of linking the interrogator with at least one of a control station, display station, database station, tag locator station, and tracking system using a wireless network, the control station providing an interface for authorized users, the display station providing an interface for the person associated with the at least one wireless identification tag, the database station storing the information associated with at least one of the person and object associated with the at least one wireless identification tag, the tag locator station a facility for determining a location of the wireless identification tag, the tracking system providing an interface between the monitoring system and an existing control system.

42. A method of monitoring persons and objects within an area as defined by claim 33, wherein the step of determining the distance further comprises the steps of:
   transmitting a first linear frequency modulated signal;
   receiving the first linear frequency modulated signal by the electronic identification tag;
   transmitting a second linear frequency modulated signal by the electronic identification tag until the step of receiving the first linear frequency modulated signal has terminated;
   receiving the second linear frequency modulated signal; and
   processing the received second linear frequency modulated signal using Fourier analysis.

43. A method of monitoring individuals and objects in an area as defined by claim 33, wherein the method includes a first mode and a second mode, the method further comprising the steps of:
   transmitting two or more interrogation codes without waiting for the acknowledgment signal while in the first mode; and
   transmitting one of the interrogation codes and waiting for the acknowledgment signal while in the second mode.

44. A method of monitoring individuals and objects in an area as defined by claim 43, further comprising the step of entering one of the first mode and the second mode selectively in response to the quantity of persons and objects to be monitored.

* * * * *